US011685354B2

(12) United States Patent
Boulivan et al.

(10) Patent No.: US 11,685,354 B2
(45) Date of Patent: Jun. 27, 2023

(54) MODULAR ELECTRONIC BRAKE SYSTEM

(71) Applicant: Carlisle Industrial Brake & Friction, Solon, OH (US)

(72) Inventors: Guillaume Boulivan, Cwmbran (GB); Sean Carey, Warwick (GB); Philip Rhead, Staffordshire (GB)

(73) Assignee: CARLISLE INDUSTRIAL BRAKE & FRICTION, Pontypool (GB)

( * ) Notice: Subject to any disclaimer, the term of this patent is extended or adjusted under 35 U.S.C. 154(b) by 280 days.

(21) Appl. No.: 17/197,861

(22) Filed: Mar. 10, 2021

(65) Prior Publication Data
US 2021/0284117 A1     Sep. 16, 2021

Related U.S. Application Data

(60) Provisional application No. 62/987,598, filed on Mar. 10, 2020.

(51) Int. Cl.
*B60T 8/36*     (2006.01)
*B60T 13/68*    (2006.01)
(Continued)

(52) U.S. Cl.
CPC ............ *B60T 13/686* (2013.01); *B60T 8/176* (2013.01); *B60T 13/142* (2013.01); *B60T 2270/10* (2013.01)

(58) Field of Classification Search
CPC ...... B60T 8/3675; B60T 8/368; B60T 13/686; B60T 8/176; B60T 13/142; B60T 2270/10
See application file for complete search history.

(56) References Cited

U.S. PATENT DOCUMENTS 4,063,624 A    12/1977   Beck et al.
7,849,880 B2   12/2010   Herges
(Continued)

FOREIGN PATENT DOCUMENTS

EP    0860609 A2      8/1998
EP     989040 A2 *   3/2000   ............ B60T 13/665

OTHER PUBLICATIONS

European Patent Office; Search Report and Written Opinion in related International Patent Application No. PCT/US2021/021726 dated Jun. 9, 2021; 13 pages.

*Primary Examiner* — Bradley T King
(74) *Attorney, Agent, or Firm* — Michael Best & Friedrich LLP

(57) ABSTRACT

A brake system to couple between brakes and actuators provides a modular format that allows a plurality of braking modules to be coupled together at interfaces and coupled to other modules to handle a variety of different braking scenarios. Each braking module includes a housing forming a manifold for the delivery of fluid to the interfaces of the modules for exchange between the modules. The braking modules include a hydraulic valve coupled with a pressurized fluid source for delivering fluid to implement a braking function. The modules also include an electro-hydraulic valve configured for receiving electrical input signals and configured for delivering fluid from the pressurized fluid source to the hydraulic valve at an actuation pressure that is proportional to the system pressure based on the levels of the received electrical input signals. Module interfaces are positioned on respective sides of the housings for coupling the braking modules together and include a repeated pattern of apertures for aligning between the braking modules. The aligned apertures are configured for passing fluid at the (Continued)

system pressure and fluid at the tank pressure between the plurality of braking modules.

19 Claims, 23 Drawing Sheets

(51) Int. Cl.
*B60T 8/176* (2006.01)
*B60T 13/14* (2006.01)

(56) References Cited

U.S. PATENT DOCUMENTS

| | | | |
|---|---|---|---|
| 8,844,573 B2* | 9/2014 | Mann | B60T 13/683 |
| | | | 137/884 |
| 10,807,575 B2* | 10/2020 | Leonard | B60T 13/665 |
| 11,124,167 B2* | 9/2021 | Kluth | B60T 15/302 |
| 2004/0145237 A1* | 7/2004 | Duchet | B60T 8/328 |
| | | | 303/127 |
| 2006/0284480 A1 | 12/2006 | Rudolph et al. | |
| 2007/0270006 A1* | 11/2007 | Herges | B60T 8/3675 |
| | | | 439/174 |
| 2008/0257670 A1* | 10/2008 | Drumm | B60T 8/4077 |
| | | | 188/358 |
| 2011/0031073 A1* | 2/2011 | Staff | B61C 17/00 |
| | | | 188/107 |
| 2011/0273004 A1* | 11/2011 | Mann | B60T 13/683 |
| | | | 303/2 |
| 2019/0031165 A1* | 1/2019 | Besier | B60T 8/92 |
| 2021/0179051 A1* | 6/2021 | Alford | B60T 13/74 |
| 2022/0153249 A1* | 5/2022 | Matoy | B60T 13/686 |
| 2023/0012180 A1* | 1/2023 | Ahn | B60T 13/662 |

* cited by examiner

2 Way Solenoid Valve 182

Check Valve

3 Way Proportional Solenoid Valve

3 Way Solenoid Valve

② to ① de-energized ——
② to ③ energized - - - -
32 cSt/150 sus oil at 40°C

| Brake channels | Brake pressures | M/Cyl | ABS | Configuration | Housing | Pilot valve | Relay valve spool assy | ABS Valve | Master cylinder Input module | M/cyl | Cut in/cut out valve | Brake pedal sensors | Wheel speed sensors | End plates |
|---|---|---|---|---|---|---|---|---|---|---|---|---|---|---|
| 1 | 1 | N | N | Single channel BBW module– must be combined with additional modules | 1 | 1 | 1 | 0 | 0 |  | 0 | 1 | 0 | 1 |
| 1 | 1 | Y | N | Single channel BBW module with m/cyl backup - must be combined with additional modules | 1 | 1 | 1 | 0 | 1 | 1 | 1 | 1 | 0 | 1 |
| 2 | 1 | N | N | Dual channel/single pressure BBW– suitable for motor grader w/rear braking only | 1 | 1 | 1 | 0 | 0 | 0 | 0 | 1 | 0 | 1 |
| 2 | 1 | Y | N | Dual brake channels with common pressure, BBW with m/cyl backup - suitable for motor grader w/rear braking only | 1 | 1 | 1 | 0 | 1 | 1 | 1 | 1 | 0 | 1 |
| 2 | 1 | N | Y | Dual brake channels with common pressure; 2 Sensor speed sensors/2 Modulators (2S2M) ABS/BBW - suitable for motor grader w/rear braking only and ABS | 1 | 1 | 1 | 1 | 0 | 0 | 0 | 1 | 2 | 1 |
| 2 | 1 | Y | Y | Dual brake channels with common pressure, BBW with m/cyl backup/4S2M ABS - must be combined with additional modules | 1 | 1 | 1 | 2 | 1 | 1 | 1 | 1 | 2 | 1 |
| 2 | 2 | N | N | Dual brake channels with two brake pressures, BBW system Suitable for agricultural and construction machines | 2 | 2 | 2 | 0 | 0 |  | 0 | 2 | 0 | 1 |
| 2 | 2 | Y | N | Dual brake channels with two brake pressures, BBW system with m/cyl backup Suitable for agricultural and construction machines | 2 | 2 | 2 | 0 | 2 | 1 | 1 | 2 | 0 | 1 |
| 3 | 2 | N | N | Three brake channels with two brake pressures, BBW Suitable for agricultural and construction machines | 2 | 2 | 2 | 0 | 0 | 0 | 1 | 2 | 0 | 1 |
| 3 | 2 | N | Y | Three brake channels with two brake pressures, BBW, ABS Suitable for agricultural and construction machines with 4 wheel braking | 2 | 2 | 2 | 4 | 0 | 0 | 1 | 2 | 4 |  |
| 4 | 2 | N | N | Four brake channels with two brake pressures, BBW Suitable for agricultural and construction machines with 4 wheel braking | 2 | 2 | 2 | 0 | 0 | 0 | 1 | 2 | 0 | 1 |
| 4 | 2-4 | N | Y | Four brake channels with up to four tailored brake pressures, BBW with ABS Suitable for agricultural and construction machines with 4 wheel braking | 2 | 2 | 2 | 4 | 0 | 0 | 1 | 2 | 4 |  |
| 6 | 2-6 | N | Y | Six brake channels with up to six tailored brake pressures, BBW with ABS Suitable for wheeled military vehicles and construction haulers | 3 | 3 | 3 | 6 | 0 | 0 | 1 | 2 | 6 |  |
| 8 | 2-8 | N | Y | Eight brake channels with up to 8 tailored brake pressures, BBW with ABS Suitable for wheeled military vehicles | 4 | 4 | 4 | 8 | 0 | 0 | 1 | 2 | 8 |  |

FIG. 11

MODULAR ELECTRONIC BRAKE SYSTEM

CROSS-REFERENCE TO RELATED APPLICATIONS

This application claims the benefit of priority to U.S. Provisional Patent Application Ser. No. 62/987,598 filed Mar. 10, 2020, the disclosure of which is incorporated by reference herein in their entirety.

TECHNICAL FIELD OF THE INVENTION

The present invention relates to brake systems and specifically an electronic brake system that may be used for various different braking scenarios.

BACKGROUND OF THE INVENTION

Generally, braking systems for vehicles, such as cars and trucks, utilize hydraulic systems that transfer fluid through a master cylinder to the vehicle brakes to act on the brakes. An actuator coupled to the master cylinder, such as a brake pedal, is moved or depressed and the movement is translated to the components of the master cylinder system in order to create pressure in the brake lines. The pressure acts upon other mechanical brake elements that are coupled to the brake lines, such as calipers and pads or brake shoes. The brake elements engage a rotating portion of the wheel assembly and slow the rotation of the wheel to stop the movement of the vehicle.

Usually, the brake systems are specifically designed for a particular unique vehicle or class of vehicles and their specific braking arrangement and the elements are configured and placed for each specific situation. As such, different master cylinder housings and valve arrangements are specifically designed for a certain application. Each application has its own arrangement and housing depending on the wheels controlled and braked and other functions of the system. One system for a unique vehicle application is generally not usable for another different vehicle application. That is, each system is unique to its specific vehicle application.

With the advent of other braking features, such as anti-lock braking systems (ABS), still other elements are implemented and designed into a larger braking system. As such, each system is limited to particular parameters and positioning in a vehicle and a system in one vehicle does not have much applicability to systems in other vehicles or for other braking scenarios. This limits the design aspects of current brake systems.

Furthermore, many such systems are only hydraulically driven and so depend primarily on the pressure from an operator's feet on the pedals for operation. As such, they are not adaptable to various different braking scenarios that might be desired such as traction control, ABS braking etc.

As such there is a need in the industry for improved braking systems that may be applied to a large number of different scenarios and in a number of different vehicles. There is a need for a braking system that incorporates interchangeable housings and components and that may be adaptable to a number of different arrangements and various braking scenarios.

SUMMARY OF THE INVENTION

A brake system to couple between brakes and actuators provides a modular format that allows a plurality of braking modules to be coupled together at interfaces and coupled to other modules to handle a variety of different braking scenarios. Each braking modules includes a housing forming a manifold for the delivery of fluid through the module to one or more brakes. The manifold provides the fluid flow to the interfaces of the modules for exchange between the modules. A pressurized fluid source couples with the modules to provide fluid at a system pressure. A tank fluid source couples with the modules to provide fluid at a tank pressure. The braking modules include a hydraulic valve positioned in the housing and coupled with the pressurized fluid source for delivering fluid through the module to the at least one brake to implement a braking function. The modules also include an electro-hydraulic valve positioned in the housing and coupled with the pressurized fluid source. The electro-hydraulic valve is configured for receiving electrical input signals and, in response to the input signals, is configured for delivering fluid from the pressurized fluid source at an actuation pressure to the hydraulic valve. The actuation pressure is proportional to the system pressure based on the levels of the received electrical input signals. A plurality of module interfaces are positioned on respective sides of the housings for coupling the braking modules together. The module interfaces each include a repeated pattern of apertures in the housing for aligning between coupled braking modules. The aligned apertures are configured for passing fluid at the system pressure and fluid at the tank pressure between the plurality of braking modules. Thus, the system may be easily expanded (or contracted) with additional braking modules that are coupled at interfaces.

BRIEF DESCRIPTION OF THE DRAWINGS

FIG. 11 is a table of various brake system configurations in accordance with various embodiments of the invention.

DETAILED DESCRIPTION OF EMBODIMENTS OF THE INVENTION

Figure 1:
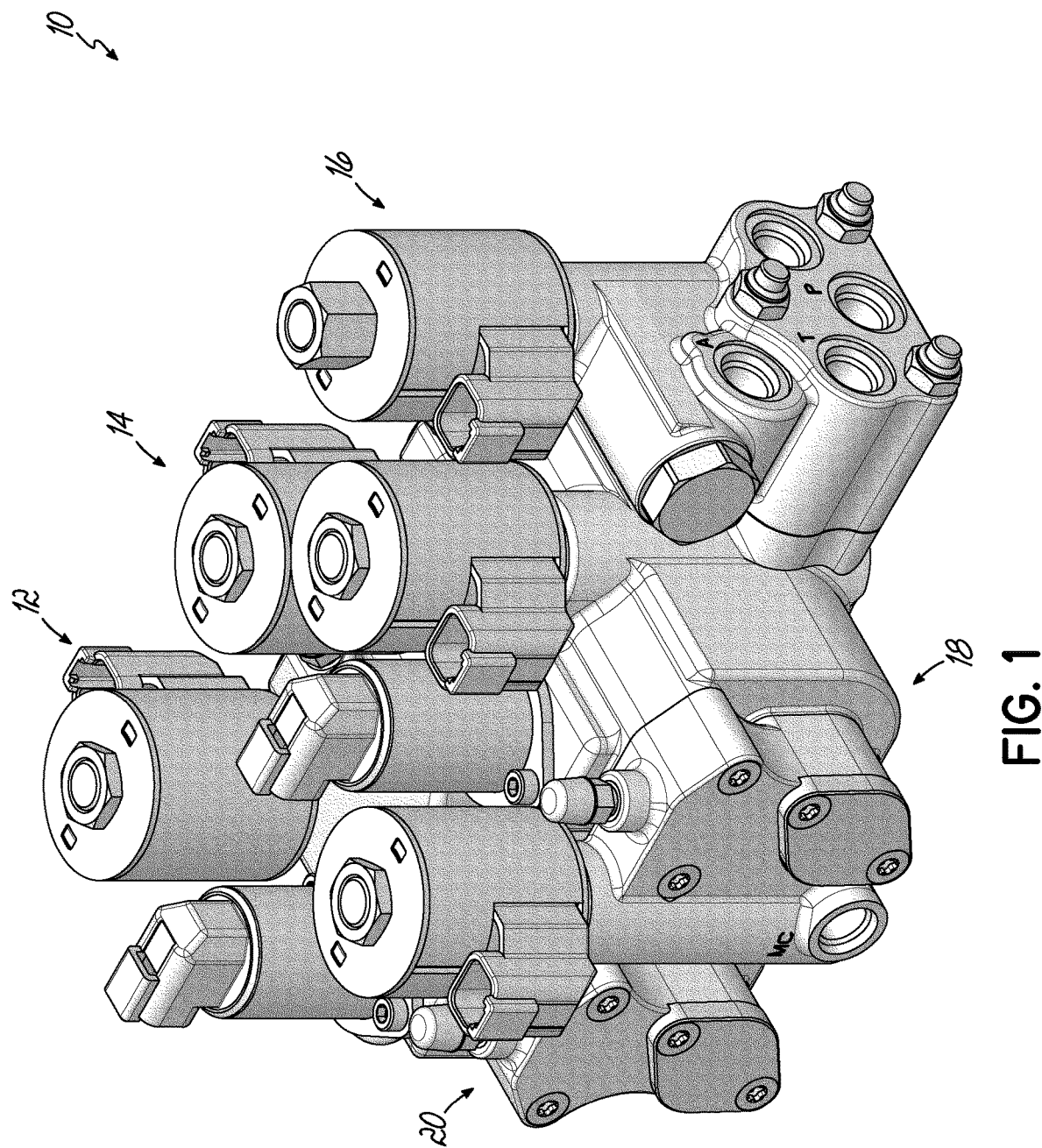
FIG. 1 is a perspective view of a modular electronic brake system in accordance with an embodiment of the invention.

Referring to FIG. 1, a modular brake system 10 is illustrated in accordance with an embodiment of the invention. Modular brake system 10 incorporates a plurality of different interactive and interchangeable modules or assemblies in different configurations in order to achieve a wide variety of operational systems and states for electronically controlled braking functions. A configuration that may be assembled using the modules of the invention may depend upon the number of wheels of the vehicle to be controlled within a system, and thus, the number of channels for braking fluid to be provided to the various wheel combinations. The configuration modules can also be arranged together and configured to address anti-lock braking features and mechanical actuation backup as well as brake steering and traction control, for example. The modular brake system 10 may incorporate various of the different modules positioned and connected in line as shown in the figures to work together in accordance with the invention to give all the desirable features. As a result, for a particular application, it is not necessary to have a specific housing constructed or specific valves pre-arranged in the housing in order to get the desirable braking functions of the system for a number of different vehicles. Furthermore, the system is expandable such that, for example, a dual channel arrangement for controlling front and rear brakes, might be expanded to a four channel arrangement for separate wheel braking. Also, a six channel or eight channel arrangement may be used depending upon additional wheels to be controlled with different brake functionality. The present invention and exemplary figures illustrate configurations for dual and form channel arrangements, but as will be appreciated by a person of skill in the art, the addition of similar modules allows for use in 6 and 8 channel applications.

The modular brake system 10 in accordance with the invention utilizes a plurality of electronic valve components and hydraulic valve components that are coupled together in modular housings to work as the system in a modular fashion that is controlled by an electronic control unit (ECU) and control algorithms for opening and closing various of the valves to provide desired braking functions. The hydraulic valve assemblies making up the modular brake system are coupled together in a linear fashion in one embodiment with a mounting structure, wherein some of the individual modular assemblies utilize redundant structures and can be coupled together (added to) into different systems for different channel applications.

Figure 2:
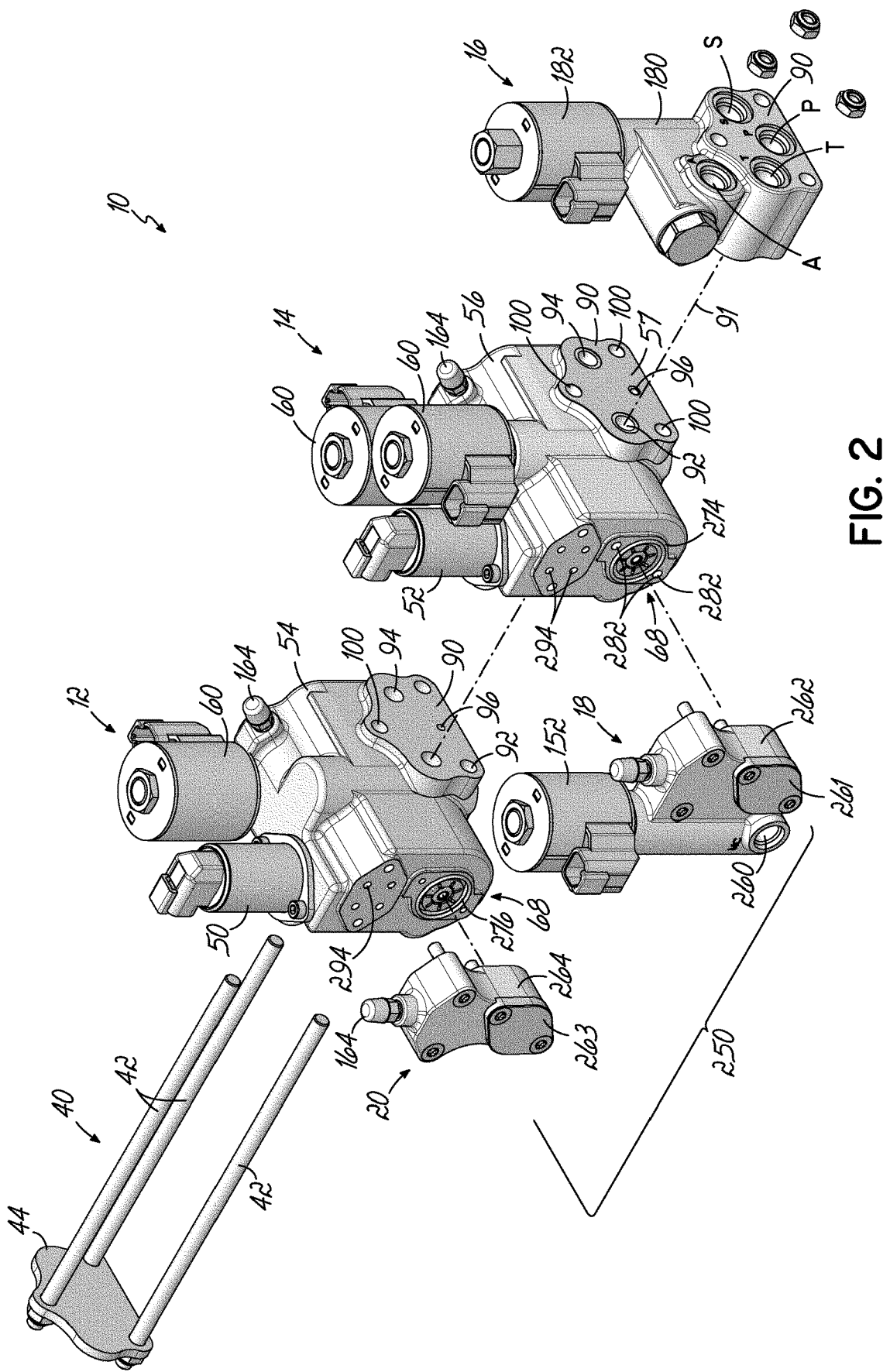
FIG. 2 is an exploded perspective view of a modular electronic brake system in accordance with an embodiment of the invention as in FIG. 1.
Figure 2A:
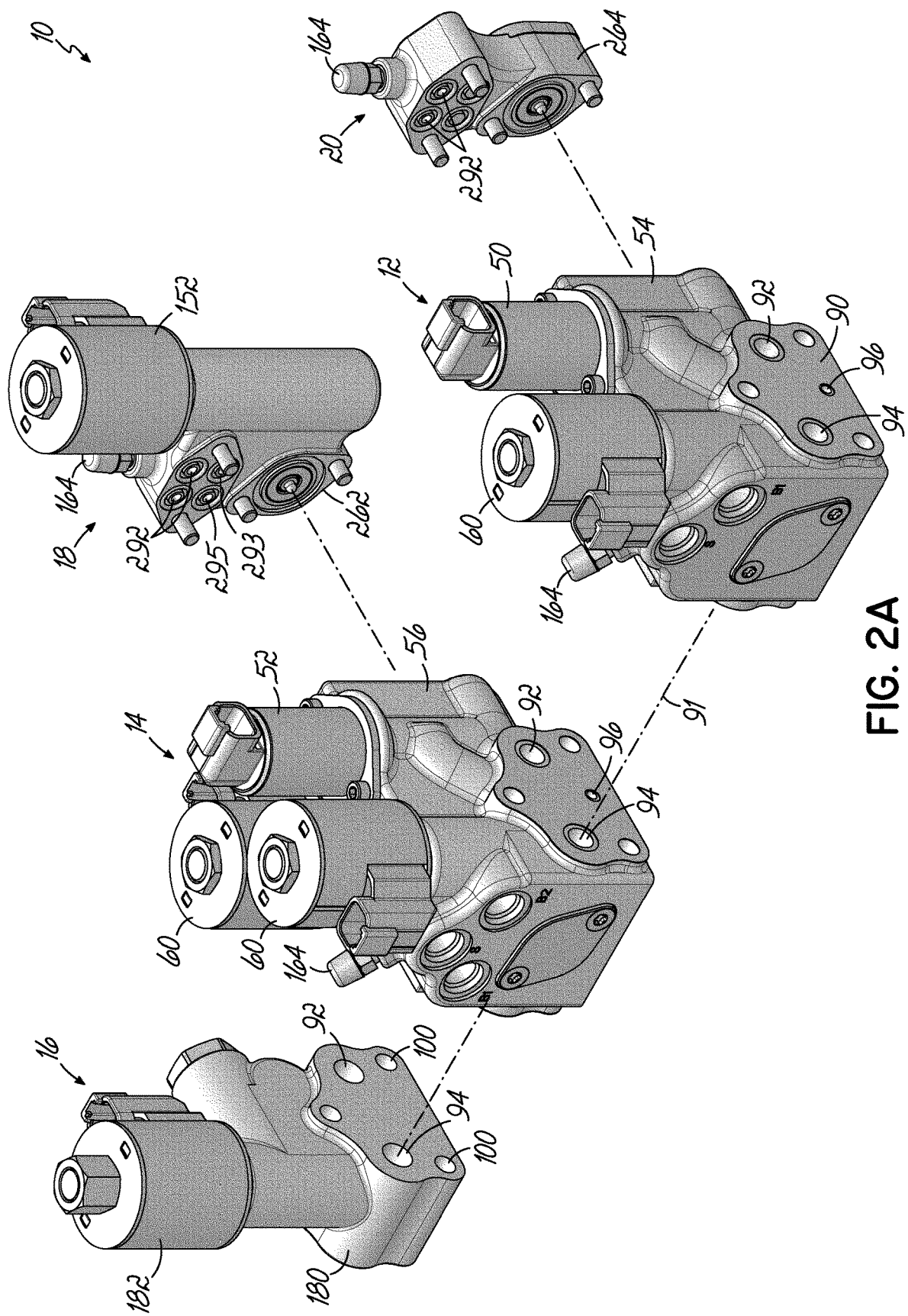
FIG. 2A is another exploded perspective view of a modular electronic brake system in accordance with an embodiment of the invention.
Figure 4:
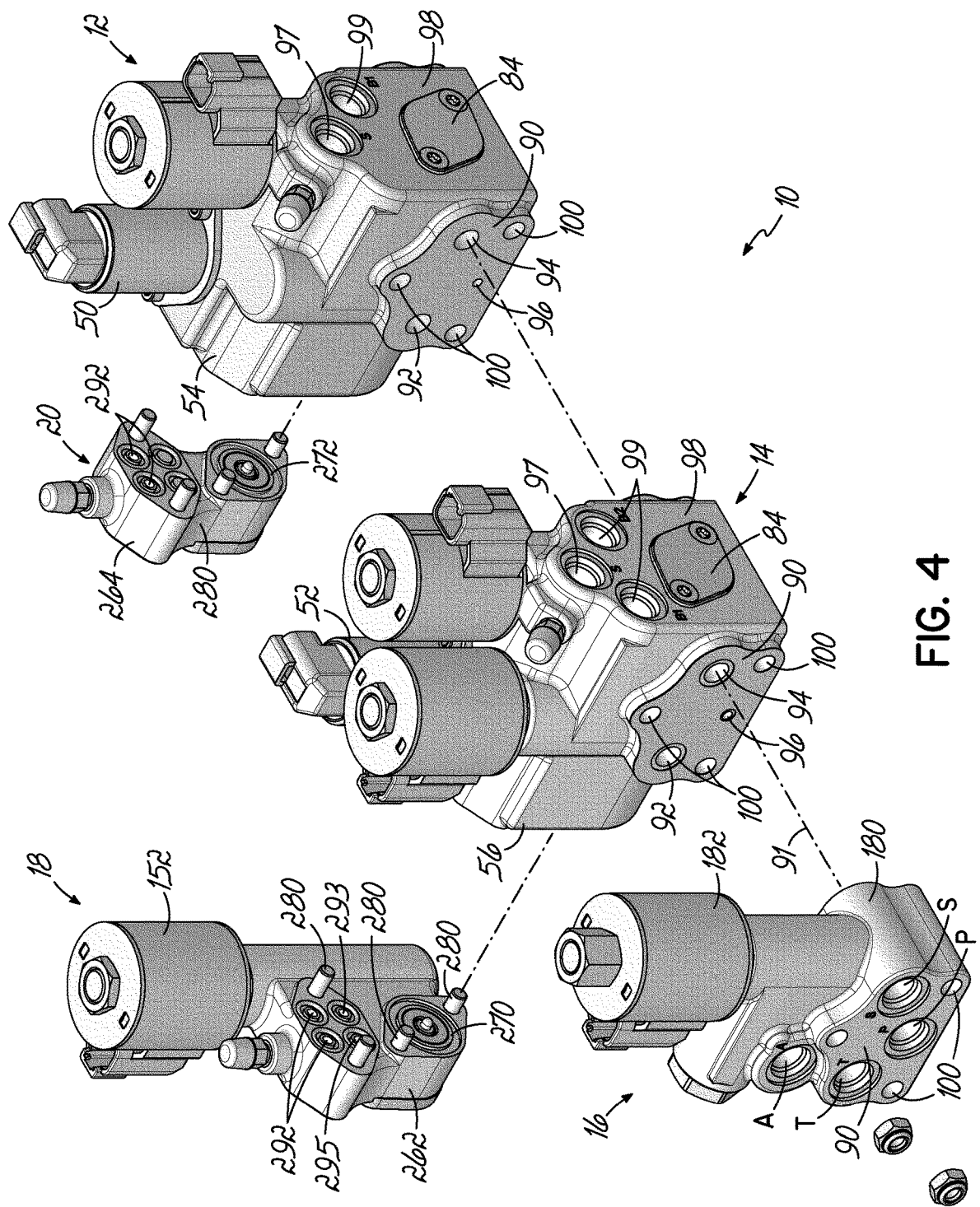
FIG. 4 is another exploded perspective view of a modular electronic brake system in accordance with an embodiment of the invention as in FIG. 1.

Specifically, referring to FIGS. 2, 2A and 4 the exemplary modular brake system 10 of FIG. 1 is illustrated broken down into the individual modular valve assemblies or modules. Specifically, assemblies/modules 12, 14, 16, 18 and 20 are illustrated coupled together with a mounting structure 40. Each of the modular valve assemblies 12-20 comprise respective housings, such as cast housings, that are coupled with and operate with electro-hydraulic cartridge valves, hydraulic valve spools, springs, pistons and plungers as described herein in order to provide the function for each valve assembly. Furthermore, each of the valve assembly housings incorporate individual mounting or interface surfaces or faces which provide not only physical coupling, but also hydraulic fluid coupling between the modular valve assemblies so that they can interact together, based upon the overall modular brake system in order to achieve the desired functions for a particular application. In that way, the individual valve assemblies can be joined together in a system to create larger or more complex modular brake systems to address vehicles having differing numbers of brakes and wheels to control.

The various individual modular valve assembly components can be arranged together into an overall system to meet specific vehicle brake system configurations. Each system will incorporate an electronic control unit programmed to operate the individual valves as desired to match the physical hydraulic valve assemblies and provide the features that are required for a particular application or customer. Furthermore, because the elements of the system are modular, the individual assemblies can be placed and mounted with respect to their respective brake actuators and can otherwise be arranged in a way that is deemed most advantageous by a vehicle integrator. Therefore, the present invention addresses a drawback of pre-existing systems incorporating all the functions into a singular housing. Various functions described herein are achieved through control commands made in combination with the multi-function valve elements to achieve the desired flow of hydraulic fluid to the wheels and brakes of a vehicle. For example, the table of FIG. 11 sets forth various different modular configurations in accordance with aspects of the invention wherein different braking scenarios may be addressed with individual modules assembled together to provide the desirable braking function as discussed further herein.

Figure 12A:
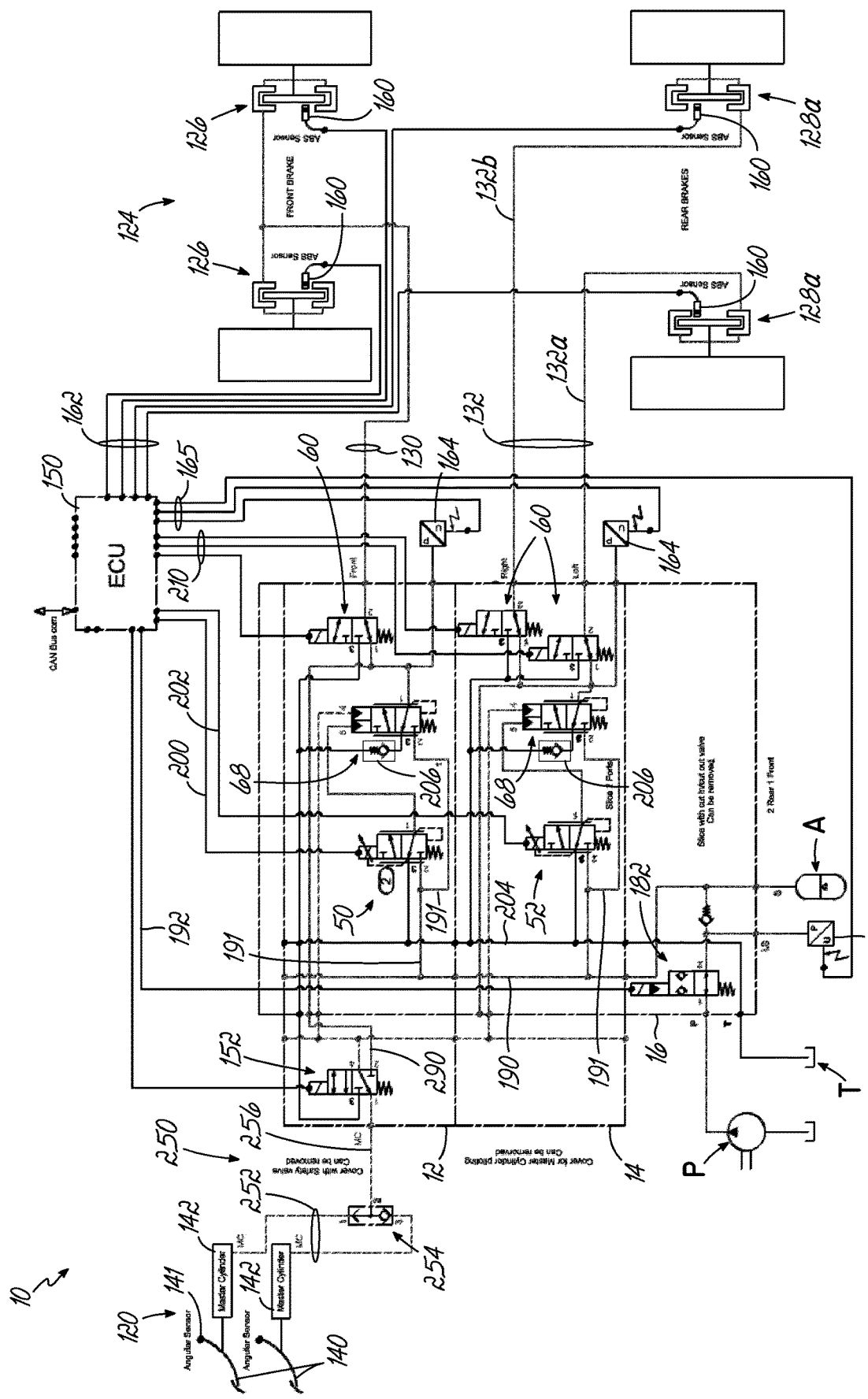
FIG. 12A is a schematic circuit view of the hydraulic circuit of the brake system in accordance with an embodiment of the invention.

FIG. 12A illustrates a hydraulic schematic showing the interconnection and fluid flow of the various modular valve assemblies and their interaction for one exemplary system. A larger or smaller modular arrangement would be used as noted in the various possible modular combinations set forth in FIG. 11. Each of the modular valve assemblies incorporates a unique combination of hydraulic valve components and electro-hydraulic valves that are electrically controlled through an electronic control unit (ECU) to provide the desired output. The specific electro-hydraulic valves are selected to provide a desirable flow for each module depending upon its operation and function within the overall modular brake system 10 and the features it provides to the system 10.

Figure 4A:
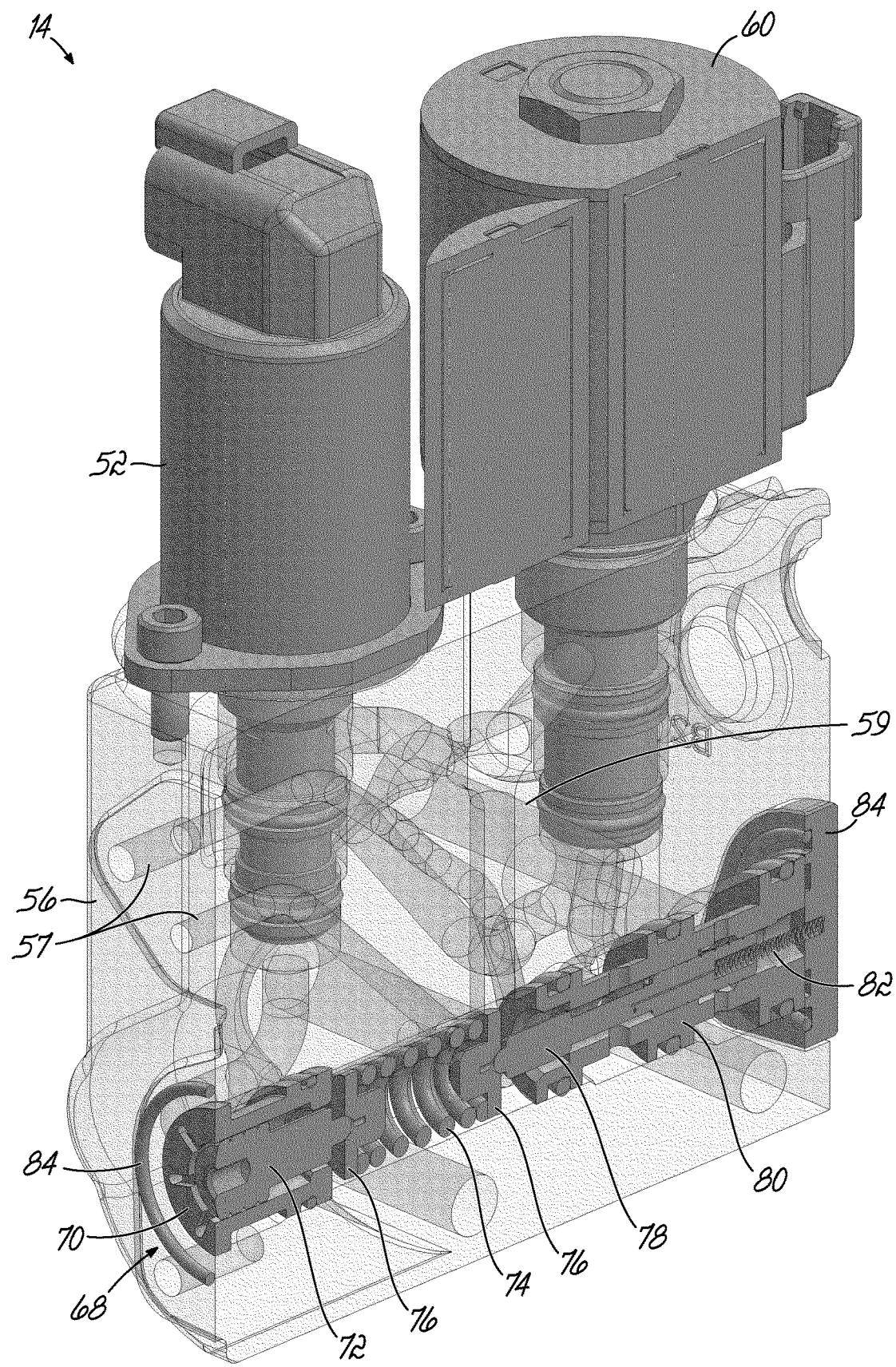
FIG. 4A is a cross-sectional view of a module of a modular electronic brake system in accordance with an embodiment of the invention.
Figure 4B:
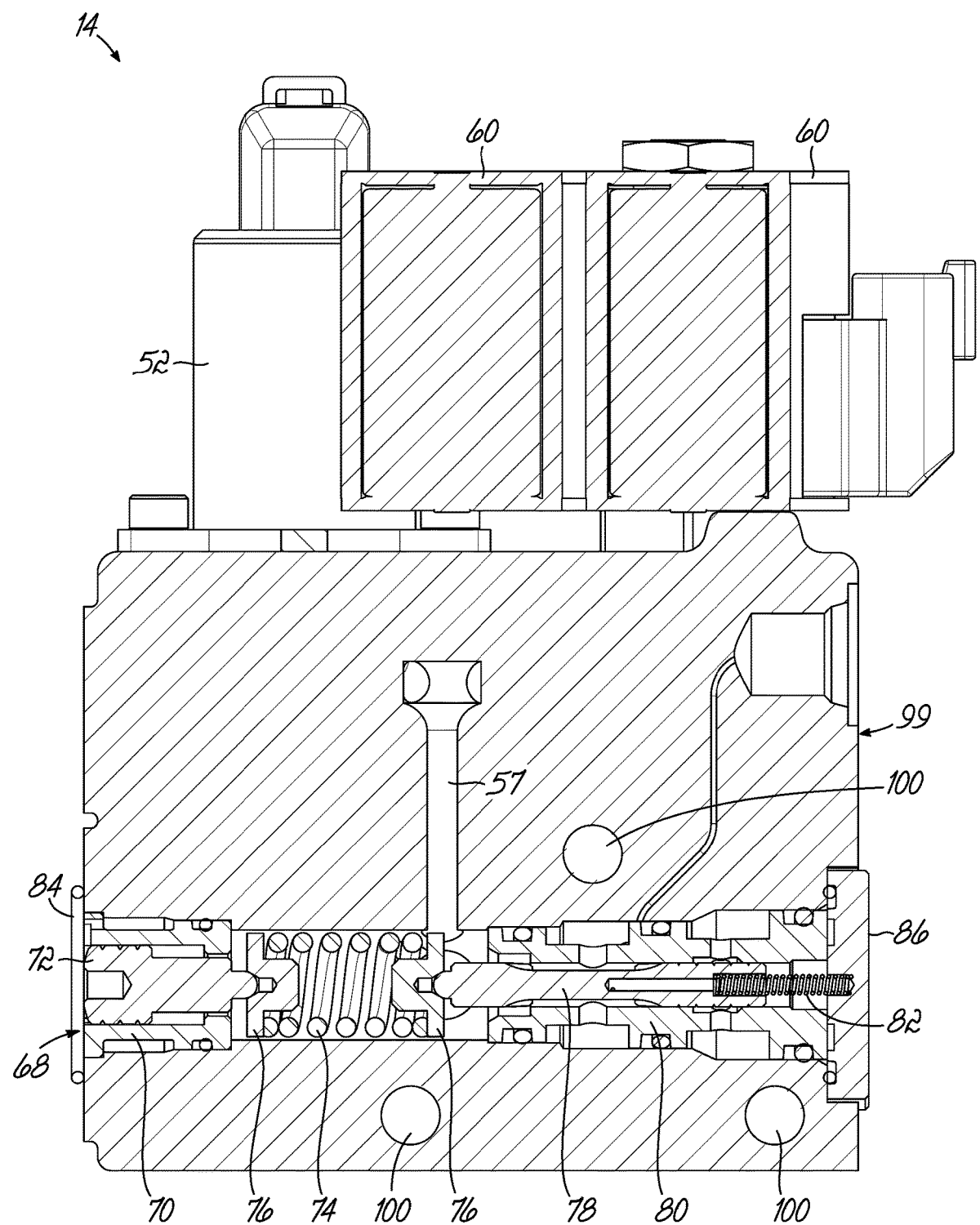
FIG. 4B is another cross-sectional view of the module of FIG. 4A in accordance with an embodiment of the invention.

The primary building block of the modular braking system 10 is provided by one or more basic braking modules 12, 14 which incorporate electro-hydraulic pilot valves 50, 52 in combination with respective relay valves 68 in the module housings. The pilot valves 50, 52 are electronically controlled by a control unit (ECU). See FIG. 12A for example. The pilot valves provide a desired proportional control of fluid to a plunger and spool arrangement of the relay valve 68 of the modules 12, 14 in order to provide the desirable electronically controlled braking. As shown in FIGS. 4A, 4B each of the basic braking modules 12, 14 incorporates a modular housing 54, 56, respectively that provides a repetitive construction between the modules. The housings 54, 56 include a body that provides a manifold structure therein having various individual internal channels 57, 59 that provide the desired flow of fluid through the module from the supply, through the various modules and then to the brakes. The internal channels 57, 59 may be arranged in a number of different ways in order to direct the fluid entering the manifold to flow appropriately into and out of the module and to present fluid at various interfaces, such as interfaces 90 and 274, 276, of each module for exchange with other modules as described herein. Therefore, the invention is not limited to the exact arrangement of various internal channels 57, 59 or other passages in the manifolds of the housings and the connections between the various ports and apertures of the modules. The manifold and passages will ensure the flow of fluid as discussed and described in FIGS. 12A-12E, for example. In the embodiment illustrated and discussed herein, anti-lock braking features are incorporated and thus anti-lock braking (ABS) valves 60 selectively are implemented on various of the modules. In the disclosed embodiment, the front brakes provide anti-lock braking (ABS) through a single channel, and so a single ABS valve 60 is shown utilized with module 12. Alternatively, for the rear brakes ABS, control is provided through module 14 thus incorporating two anti-lock brake valves 60 as illustrated in FIG. 12A.

An exemplary module 14 is described herein with respect to housing 56 and various components. It will be understood that various features and elements are similar in the module 1212 and housing 54. Referring again to FIGS. 4A, 4B, the housing 56 is configured to house the relay valve 68 and the respective pilot valve 52 to operate together. The housing 54 will be similarly constructed and configured in accordance with the invention. The relay valve 68 is a mechanical valve which is controlled by electro-hydraulic valve 52 and utilizes a plunger sleeve 70 which seats a plunger 72 against a regulator spring 74 and spring seat 76. The plunger acts on a spool 78 that is seated in a spool sleeve 80 and coupled with a return spring 82. Each end of the housing 56 may be coupled with suitable covers for the containment of the fluid, such as cover 84 as seen in the figures. Depending upon if a hydraulic backup is provided to the system 10 through one or more master cylinders, the cover 84 might be removed for coupling with a module 18, 20 as illustrated in FIG. 2 and discussed herein.

In accordance with one embodiment of the invention, each of the core modules 12, 14 are coupled through module 16 with a sufficient supply of hydraulic fluid both from a tank T as well as a pressurized source P and an accumulator A as will be readily understood by a person of ordinary skill in the art. As discussed herein, module 16 incorporates interfaces 90. The interfaces 90 provide a coupling face surface to the tank T, pressurized source P and accumulator A on one side as seen in FIG. 2 and provide a matching interface 90 to couple with module 14 as shown in FIGS. 2, 2A. The manifold passages 57, 59 of the housings 12, 14 direct fluid as used according to schematic of FIG. 12A. In accordance with one aspect of the invention, the various modules utilized in the system 10 of the invention include the modular mounting surfaces or interfaces 90 with appropriate apertures for coupling with the supplies of hydraulic fluid and also for providing the flow of fluid between the manifolds of the various modules and subsequently out of the modules to the brakes of a vehicle. As illustrated in FIG. 2, the interfaces 90 of each of modules 12, 14, 16 provide for a linear alignment and coupling of the modules so the flow of fluid progresses from module to module. Linear alignment is provided along an axis 91 as shown in FIG. 2. In accordance with another feature of the invention, the interfaces 90 incorporate repeated patterns of fluid apertures 92, 94, 96 for achieving the modular aspects of the invention. As noted, various modules 12, 14 may be linearly arranged or stacked for providing various configurations as illustrated in FIG. 11. The modules of the modular system present the fluid at the mounting interfaces so that coupling the modules together provides proper flow through the modules.

Figure 3:
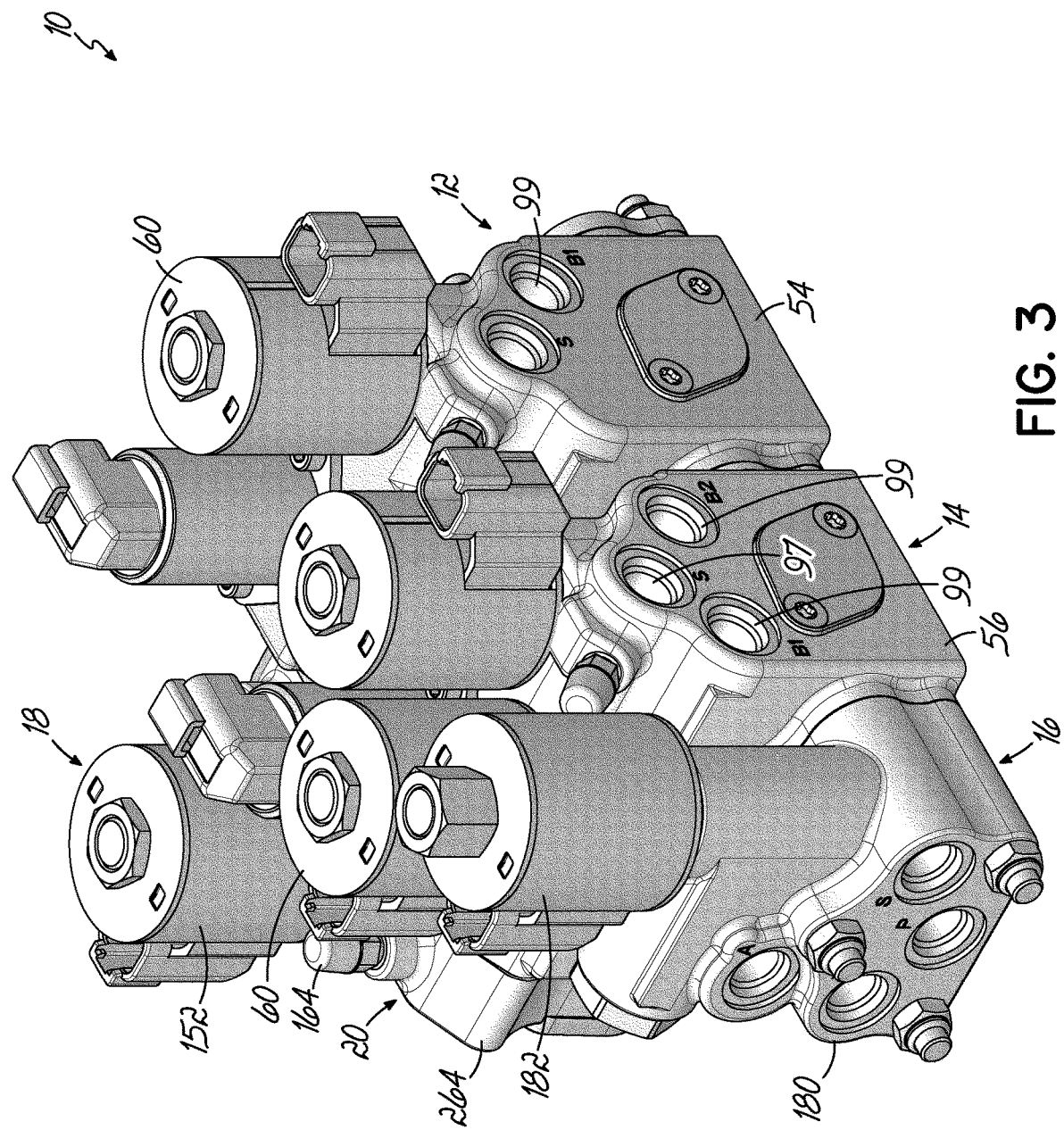
FIG. 3 is another perspective view of a modular electronic brake system in accordance with an embodiment of the invention as in FIG. 1.

Referring to FIG. 4, illustrating another exploded perspective view of the different modules of system 10, each of the core modules 12, 14 are shown with mounting interfaces 90 at their sides which include the apertures 92, 94, 96 for coupling the specific sources of hydraulic fluid through the assembly of FIG. 1. As may be seen between modules 12 and 14, the duplication and the interface repetition of patterns of apertures provides the desirable modularity such that individual core brake modules 12, 14 may be positioned and mounted together and added to or subtracted from depending upon the desired brake system and functionality and wheels to be controlled. Each of the interfaces 90 are constructed and arranged similarly so that the fluid supply channels from the various sources (e.g. tank, system pressure, etc.) are coupled together when the modules are mounted together in an assembly (FIGS. 1, 3). Each of the modules 12, 14 also includes an interface 98 on a face of the housings 12, 14 that is generally directed at an angle to axis 91. In the illustrated embodiments, the interfaces 98 are facing a direction perpendicular to the axis 91 and the facing direction of interfaces 99. The interfaces have passages 97, 99 for coupling with other components in the system in a modular fashion. For example, passages 97 might be coupled to a sensor, wherein passages 99 might be coupled with brake channels/brakes as discussed in FIGS. 12A-12E.

For the purposes of mounting and assembling the modules, referring to FIG. 2, each of the housings 54, 56 may be configured with a pattern of through holes 100 that receive alignment structures 42 extending between and through each of the modules 12, 14 in the direction of axis 91. The pattern of holes 100 is duplicated or repeated in the modules 12, 14, 16, for example, to add or subtract modules from the system. As shown in FIG. 2, the alignment structures or mounting structures 42 may be in the form of linear elements or shafts which extend through appropriate cylindrical cavities or apertures 100 in each of the housings 54, 56, 80. The mounting and alignment structures 42 provide the desired alignment between the modules 12, 14, 16 with their mounting interfaces 90 properly interfaced or seated for proper operation and proper hydraulic fluid flow. The alignment of the through holes provides alignment of the repeated pattern of apertures through the modules. The shaft elements 42 may be coupled together, such as through a plate 44 or other structure to keep them in proper orientation and proper alignment with respect to axis 91 and the modules of the overall system 10. As may be appreciated, the shafts 42 may be made an appropriate length to accommodate all the various modules 12, 14, etc. that may be coupled together for system 10.

Referring to FIGS. 2A and 4, module 16 which provides interconnection to supplies of hydraulic fluid incorporates opposing mounting interfaces 90 that include corresponding apertures for tank T, supply pressure P, accumulator A and a sensor S and fluid passages 92, 94 on an opposite interface 90 for coupling the tank T of fluid and the pressurized supply source P of fluid to the modules 12, 14. In that way, module 16 may be mounted in line with the core modules 12, 14 and operate therewith through mounting of the mounting interface 90 with the appropriate mounting interface 90 of an adjacent module. The repetitive patterns of the tank ports 94, supply pressure ports 92 and then master cylinder ports 96 ensure proper flow when modules are added. As may be appreciated, the various housings 56, 54 and other housings as discussed herein for performing each of the hydraulic and electro-hydraulic valve modules have appropriate internal manifolds configured to provide the proper flow of pressurized fluid and tank pressure fluid through the various modules to provide the braking functions as described in FIGS. 12A-12E. The module housings and manifolds also present the fluid at the mounting interface surfaces in the proper arrangement or patterns to pass fluid from module to module. Each of the fluid flow apertures at the mounting interface 90 of the housings are in a pattern that is repeated throughout the modules to ensure proper fluid flow and alignment when the mounting system 40 and the appropriate alignment structures 42 are utilized to couple together the modules into a system as illustrated in FIG. 1.

Referring again to FIG. 12A, the system schematic is illustrated showing various modular components coupled together in the example system 10 between brake actuators 140, 141 and a vehicle 124. Specifically, a brake actuation system 120 is coupled to the modular brake system 10 and a vehicle 124 having individual front brakes 126 and rear brakes 128a, 128b. In the embodiment described, the anti-lock braking systems and braking of the front brake is provided through a single brake fluid channel 130 (module 12) whereas the braking provided to the rear brakes is provided through a dual brake fluid channel arrangement 132 (module 14). The actuation mechanism 120 may incorporate one or more actuators 140, 141 such as brake pedals that are each coupled to a respective master cylinder 142. In accordance with one embodiment invention, a master cylinder connection module 250 might be coupled with system 10 to provide a master cylinder hydraulic backup in addition to the electronic control provided by ECU 150. Referring to FIG. 2, the master cylinder connection module 250 is represented by individual modules or module portions 18, 20. Module 18 provides a master cylinder module pilot section that takes in master cylinder pressure at port 260 (se FIGS. 1 and 2) and delivers it to module 12 whereas module 20 provides a master cylinder module relay section that delivers or relays master cylinder pressure to the module 14. To that end, module 18 incorporates a mode selection valve 152 as discussed herein for providing a master cylinder backup, such as in case there has been an electrical failure or a failure of the ECU 150.

Each of the exemplary valve modules 12-20 are appropriately coupled with the ECU 150 for operating the electro-hydraulic valve components as appropriate as shown in FIG. 12A. Also, depending upon the application and installation of the modular brake system, various ABS sensors 160 may be coupled to the ECU, such as through lines 162. In accordance with one feature of the invention, various pressure sensors 164 may be coupled to the ECU, such as through lines 165.

As noted, the various core braking modules 12, 14 incorporate a hydraulic relay valve 68 and respective electro-hydraulic pilot valves 50, 52 which are coupled together through an appropriate housing 54, 56 and manifold as shown in FIG. 2. In operation, the electro-hydraulic pilot valves 50, 52 respond to electrical commands from the ECU and deliver proportional hydraulic pressure from a supply channel of pressure to hydraulic relay valve 68 and the plunger cavity as illustrated in FIGS. 4A, 4B. Supply pressure in the supply channel is provided to system 10 through supply module 16 which incorporates a housing 180 and a supply valve 182 which operates to deliver supply pressure from a supply P to the system supply channel through accumulator A as shown in FIG. 12A. Housing 180 will also provide an appropriate manifold for directing fluid at tank pressure and supply pressure through the module 16 to be delivered to modules 12, 14, for example when coupled with those modules. One mounting interface (FIG. 2) of the module 16 provides apertures to couple to pressure supply P, a tank T, an actuator A, and sensor S. The opposing interface 90 (FIG. 2A) of module 16 delivers supply pressure at port 92 and tank pressure at port 94. That arrangement is maintained through the other modules as shown in FIGS. 2 and 4. The manifold of the housing 180 ensures the fluid paths as discussed with respect to FIGS. 12A-12E, for example and so the exact arrangement inside the housing is not limiting as long as the fluid is directed and presented between the apertures, P, T, A, S as well as apertures 92, 94.

Figure 5A:
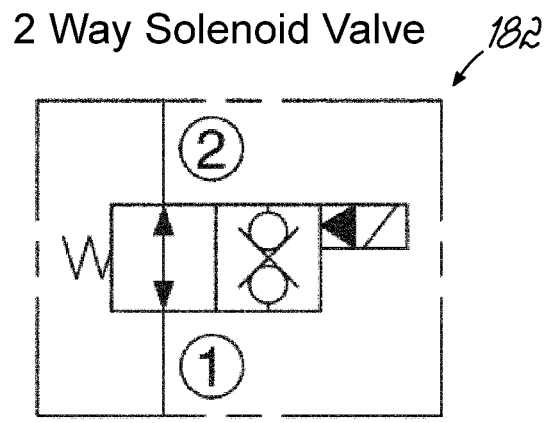
FIGS. 5A and 5B are schematic views of a valve and its pressure and flow characteristics in accordance with an embodiment of the invention.
Figure 5B:
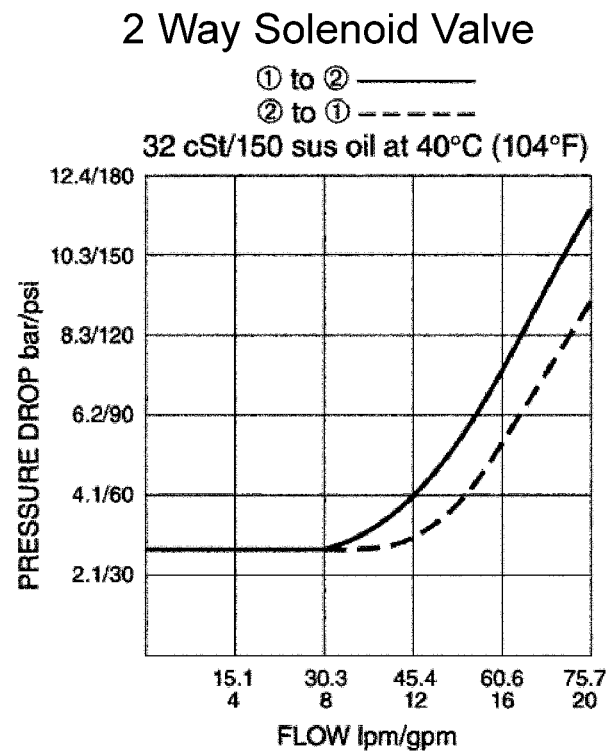

FIG. 5A illustrates one exemplary supply valve 182 along with flow characteristics as illustrated in FIG. 5B. Specifically, supply valve may be a solenoid-operating, two-way valve, that is normally open. Valve 82 may be a poppet-type, internally piloted, screw-in hydraulic cartridge valve that is designed for low leakage in load-holding applications. The operation of supply valve 182 provides appropriate delivery of supply pressure from source P to accumulator A and to system supply line 190 as shown in FIG. 12A. Referring to FIG. 2, the supply pressure is also delivered through the manifold of housing 180 to a sensor port S. The supply pressure is delivered at port 92 of module 16. In operation, when the valve is deenergized, the valve allows flow in both directions. Valve 182 is coupled to the ECU 150 through line 192. When energized, the valve's poppet closes, thus blocking flow in both directions.

In the operation of the core or main braking modules 12, 14, as illustrated in FIGS. 4A, 4B, the modules utilize proportional features for providing the desired braking through the combination of hydraulic relay valve mechanism 68 piloted by a proportional pilot valve 50, 52 in accordance with the inventions. Specifically, referring to FIGS. 4A, 4B and 12A, when brake actuators 140 are actuated, such as by the depression of a brake pedal, angular sensors 141 detect the angle. The sensors are coupled with the ECU 150 and the ECU provides electrical commands through lines 200, 202 to the proportional pilot valves 50, 52, respectively. The pilot valves 50, 52 are electro-hydraulic valves that are coupled to the fluid source providing system pressure and that proportionally respond to electrical commands from the ECU to deliver hydraulic pressure as an actuation pressure from the supply channel to plunger 72 of relay valve 68 that moves within an appropriate sleeve 70 and cavity within the housing 54, 56 against spring 74. The hydraulic relay valve 68 is also coupled to the fluid source or supply at system pressure P. The spring translates the plunger motion through spring seat 76 onto the spool 78 as shown that moves within the spool sleeve 80. Referring to FIG. 12A, supply line 190 directs supply pressure fluid to the valves 50, 52. Each of the pilot valves 50, 52 are coupled to the hydraulic relay valve 68 to thereby provide a supply pressure channel through the modules 12, 14. Also, each of the hydraulic relay valves 68 is also separately coupled to another supply channel, through lines 191 as illustrated in FIG. 12A. As such, as the spool 78 moves based on the actuation pressure provided by valves 50, 52, it uncovers another hydraulic supply pressure channel, thus allowing the supply pressure hydraulic fluid to flow to a port leading to a fluid conductor or a line connected to the brakes and brake system such as through channels 130 and 132 as illustrated in FIG. 12A. Within the hydraulic relay valve 68 of FIG. 12A (shown in cross-section in FIGS. 4A, 4B) as the pressure in the brake system builds, the hydraulic fluid is allowed to flow through an orifice in the spool to a chamber behind the spool. Therefore, the spool becomes balanced between the oil pressure and the regulation provided by the force of return spring 82. This causes the spool 78 to move back to a position that blocks the other pressure supply channel, thus leaving the system in equilibrium as would be understood by a person of ordinary skill in the art with respect to brake valve assemblies. The pilot valves 50, 52 thereby proportionally control the relay valves 68 for delivering pressurized fluid to the brakes.

Figure 9:
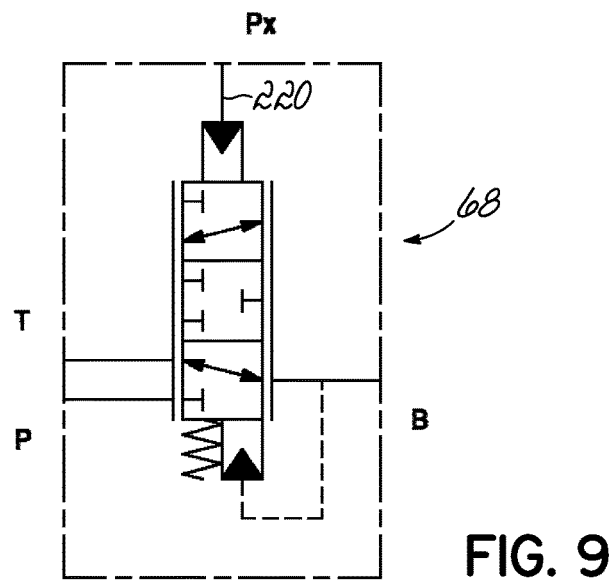
FIG. 9 is a schematic view of a valve in accordance with an embodiment of the invention.
Figure 10A:
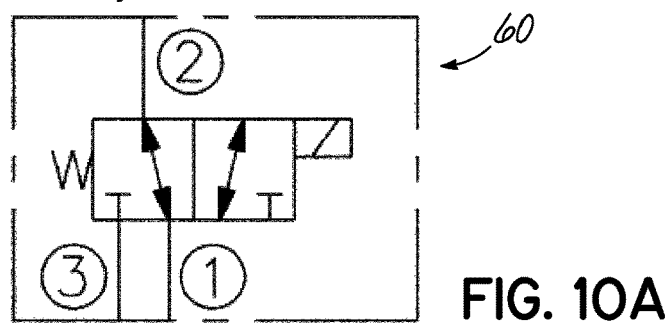
FIGS. 10A and 10B are schematic views of a valve and its pressure and flow characteristics in accordance with an embodiment of the invention.
Figure 10B:
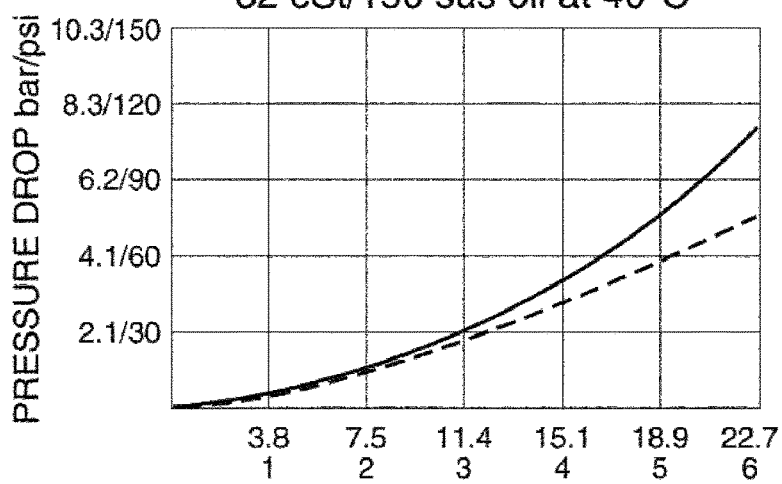

The relay valve assembly 68 operates as shown in FIG. 9 as a piloted power valve in the respective modules 12, 14 as controlled by pilot valves 50, 52. In operation, the valve assembly 68 is an indirect-acting, spool-type, proportional power valve with closed transition. Such a valve can be used with mineral-based hydraulic fluids. The regulated pressure is proportional to the input pilot pressure or actuation pressure received from the respective pilot valve 50, 52 which is controlled through the ECU 150 in accordance with aspects of the invention. The relay valve 68 normally provides a free connection between the brakes B and tank pressure T when no pilot pressure or actuation pressure $P_x$ is applied through the respective pilot valve 50, 52. When actuation pressure $P_x$ is provided by the pilot valves 50, 52 the brakes B are connected to system pressure P. Increasing the pressure applied as $P_x$ by the pilot valves will increase the control (reduced) pressure to the brakes proportionally. When the pressure at the brakes 126, 128 exceeds the setting induced by $P_x$, the pressure from the brakes will be relieved to the tank T.

Figure 6A:
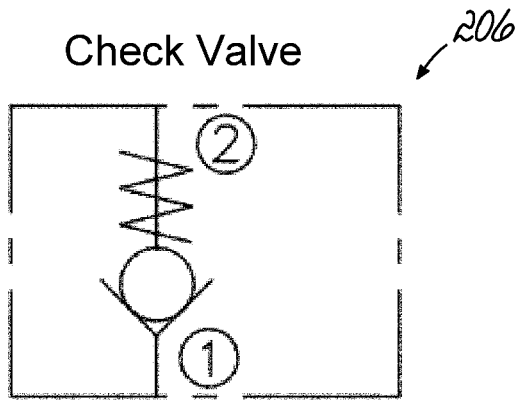
FIGS. 6A and 6B are schematic views of a valve and its pressure and flow characteristics in accordance with an embodiment of the invention.
Figure 6B:
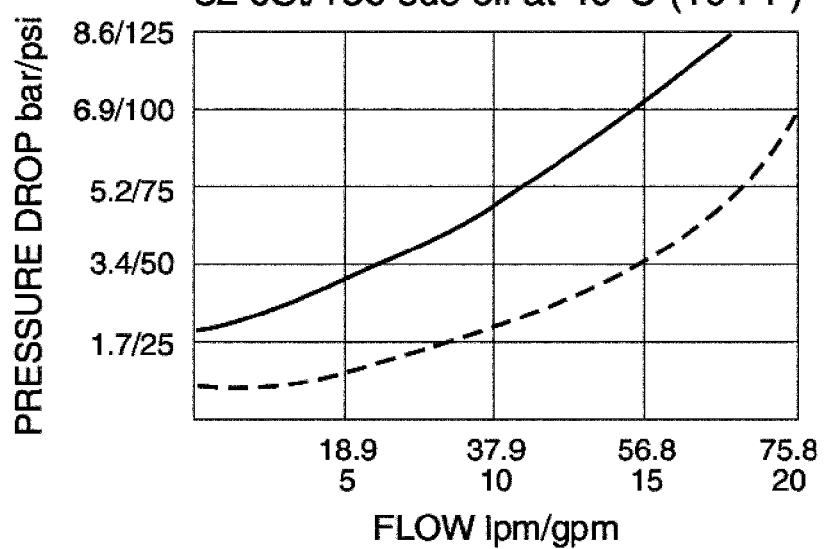

A reduction in the displacement and the actuation of actuators 140, such as taking your foot off of the brake pedal, provides signals through sensors 141 to the ECU 150 which then reduces the current through lines 200, 202 to the pilot valves 50, 52. This leads to a proportional reduction in the pilot pressure or actuation that is delivered to the plunger 72 within the relay valve assemblies 68. This thereby reduces the spring force on the spool 78 and reduces the braking force provided through the valve assembly 68 to the brakes 126, 128 of vehicle 124. The spool 78 then moves to a new location in relay valve 68 of the housings 54, 56 and connects the brake pressure port to a tank port, thus reducing the hydraulic pressure in the brakes. As illustrated in FIG. 12A, each of the relay valves 68 is coupled through line 204 to tank pressure through appropriate check valves 206. The check valves provide a minimum amount of pressure within the brakes when the brake pressure is released in the relay valves 68. The check valves 206 may implement a valve construction as illustrated in FIG. 6A having a pressure and flow diagram as illustrated in FIG. 6B. For example, check valve 206 may be a screw-in, cartridge-style, hydraulic check ball valve that is used as a blocking or load holding device. In operation, the valve allows flow passage from 1 to 2 as illustrated in FIG. 6A, while normally blocking oil flow in the opposite direction. The valve cartridge may have a fully guided check which is spring-biased closed until sufficient pressure is applied at 1 to open 2 as shown in the figure. The check valve 206 may be configured to provide a low backup pressure, such as 1-2 bar that may be monitored by pressure sensors 164 to ensure that there is no fault or failure within the brake lines from the system 10 to the brakes 126, 128 of vehicle 124.

Figure 8A:
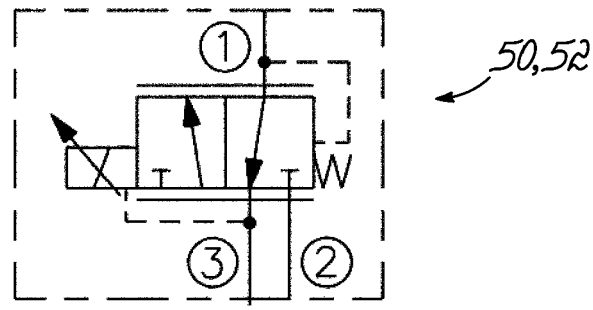
FIGS. 8A and 8B are schematic views of a valve and its pressure and flow characteristics in accordance with an embodiment of the invention.
Figure 8B:
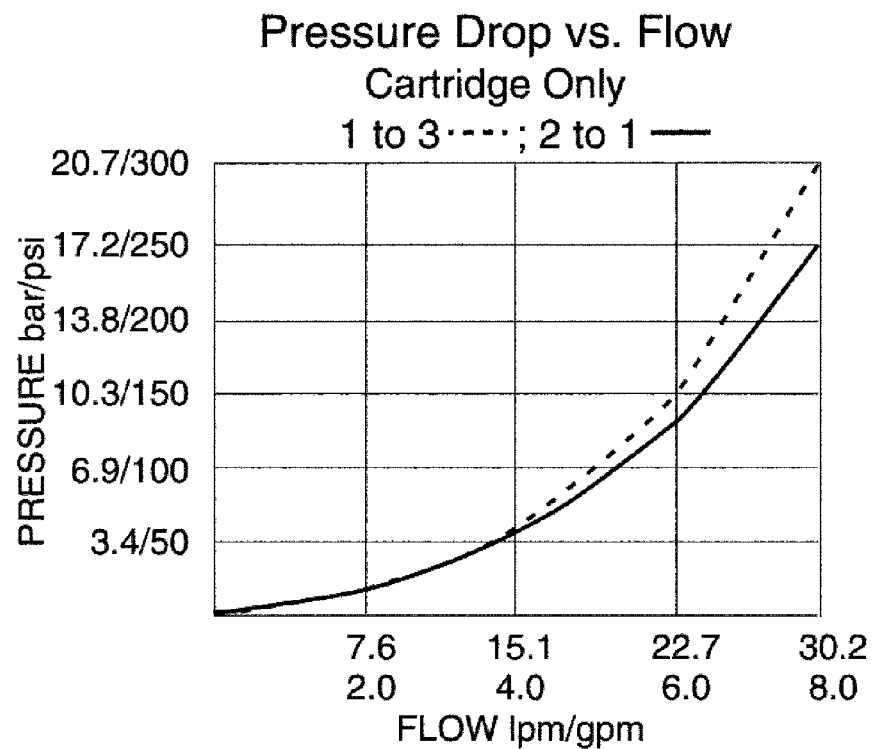

Returning to FIGS. 4 and 12A, the pilot valves 50, 52 are proportional valves for providing the desired electronic control of the braking pressure through the ECU based upon the sensing of the movements of actuators 140, such as the angular depression of a brake pedal, based upon signals from an angular sensor 141. In one embodiment of the invention, the proportional pilot valve may be a three-way proportional solenoid valve as illustrated in FIG. 8A, which may have a pressure and flow diagram response as shown in FIG. 8B. A proportional pilot valve may be a direct-acting, spool-type, proportional valve, with pressure reducing/relieving functionality. Such a valve is suitable for use with mineral-based or synthetic hydraulic fluids. Generally, the coil may be an integral part of the valve and the regulated pressure is proportional to the input electrical current in the pressure ranges as shown in FIG. 8B. In operation, the valve allows free flow from 1 to 3 when no current is applied to the coil. As shown in FIG. 12A, that essentially provides tank pressure T through the valve when it is not energized through the ECU. When the valve is energized and particularly when the solenoid coils is energized, 2 is connected to 1 which provides supply channel pressure P through the valve to relay valve 68, as described herein. Through the ECU, increasing current applied to the solenoid coil will increase the control (reduced) pressure proportionally. If the pressure at 1 provided to the relay valve 68 exceeds the setting induced by the coil, the pressure will be relieved to 3, or tank pressure.

Depending upon the functionality desired for the modular brake system 10, one or more of the wheels may include an anti-lock brake system (ABS) functionality. In such a configuration, the main braking modules 12, 14 incorporate one or more ABS valves 60 which operate with the manifold provided by the respective housings 54, 56 as shown in FIGS. 4A, 4B for controlling the flow of fluid and a connection between supply pressure and tank pressure based upon the ABS requirements of the vehicle. For example, as illustrated in FIGS. 1-4, multiple ABS valves 60 are coupled to the housing 56 and to the manifold passages 57,59 provided therein for providing the ABS brake function through the respective braking module, such as module 14. Referring to FIG. 12A, ABS valves 60 are illustrated coupled with the output of the braking modules 12, 14 to provide ABS functionality. Specifically, as illustrated the various ABS valves 60 are coupled through control lines 210 to the ECU for providing control of the valves for ABS purposes. As noted, ABS sensors 160 are coupled to the ECU through lines 162 to provide feedback on brake conditions in the brakes 126, 128 of vehicle 124. In the embodiment discussed herein and illustrated in FIG. 12A, the ABS functionality is provided to both of the front wheels through a common brake channel 130, but is provided to each of the rear wheels and rear brakes 128a, 128b through a pair of brake channels 132a, 132b, respectively. Thus, the system is a three channel system implementing three ABS valves 60 as shown in FIG. 12A for 3 wheels. Other scenarios may be implemented using different modules and different valve combinations in accordance with aspects of the present invention and as discussed with respect to FIG. 11 showing various different configurations utilizing the modular brake system 10 of the invention. Referring to FIG. 4, the module 14 is illustrated with multiple ABS valves and also multiple fluid passages 99 for the two brake chambers as well as a sensor passage 97. The module 12 has a single ABS valve 60 and a single brake passage for brake channel 130.

As shown in FIG. 12A, each of the ABS valves 60 are coupled to tank pressure T and to the supply pressure from the supply through the modules and relay valves 68. The supply pressure is provided through the modules 12, 14 to provide supply pressure directly to the brakes through the operation of modules and the channel lines 130, 132a, 132b as illustrated. FIG. 8A illustrates one embodiment of an ABS valve as used in the modular brake system of the invention. Valve 60 is a solenoid-operated, three-way, direct-acting, spool-type valve. It's pressure and flow characteristics are illustrated in FIG. 8B. When deenergized, which is the normal operation of the braking system, the valve 60 allows flow from 2 to 1, indicating that system pressure or whatever pressure is presented through the relay valves 68 and through the modules 12 and 14 is delivered to the brakes. The flow at 3 is blocked. However, when the ABS functionality is triggered, such as by one or more of the sensors 160, the ECU provides a controlling signal to energize valve 60. When energized, such as for implementing anti-lock braking features of the invention, the valve spool shifts to open from 2 to 3 while blocking at 1 thus connecting the various brake channels 130, 132 with tank pressure T from line 204. Such a connection provides coupling of the brake channels 130, 132 to the tank pressure T thus selectively removing or disrupting braking pressure from the appropriate brakes. In that way, the anti-lock brake features for one or more of the brakes 126, 128 of vehicle 124 is provided as desired in the operation of the system. As indicated, in the system disclosed, module 12, which is coupled with the front brakes utilizes a single channel 130, such that the ABS functionality is provided through a single valve 60 to each of the front brakes 126 and the appropriate wheels. For rear braking, each of the rear brakes 128a, 128b is maintained by a separate channel 132a, 132b that is coupled with an appropriate respective ABS valve 60. As such, each of the rear brakes may be individually operated with the ABS functionality as selected by appropriate sensors 160 and ECU control.

In accordance with another aspect of the invention, the modular brake systems may incorporate a valve module that provides for hydraulic backup of the electronic system, such as in the case of electronic failure through the ECU, to provide the desired braking functionality based upon the position of actuators 140, such as the angle of depression of a brake pedal. In that regard, the modular brake system 10 is coupled to one or more master cylinders 142 for providing hydraulic functionality through the system based upon the actual depression of the actuators 140 as shown in FIG. 12A rather than electronic control.

Referring to FIGS. 2-4, a master cylinder connection module 250 may be implemented in the system. The master cylinder connection module 250 includes separate module sections or modules 18, 20. Module 18 acts as a pilot section, whereas module 20 acts as a relay section. The entire master cylinder connection module 250 provides a link to master cylinders 142 through port 260 (FIG. 2) and a means to change from electrical input to hydraulic input and provides a hydraulic link with master cylinders to drive the main modules 12, 14 as appropriate based upon the interaction between actuators 140 and the master cylinders 142.

Figure 4C:
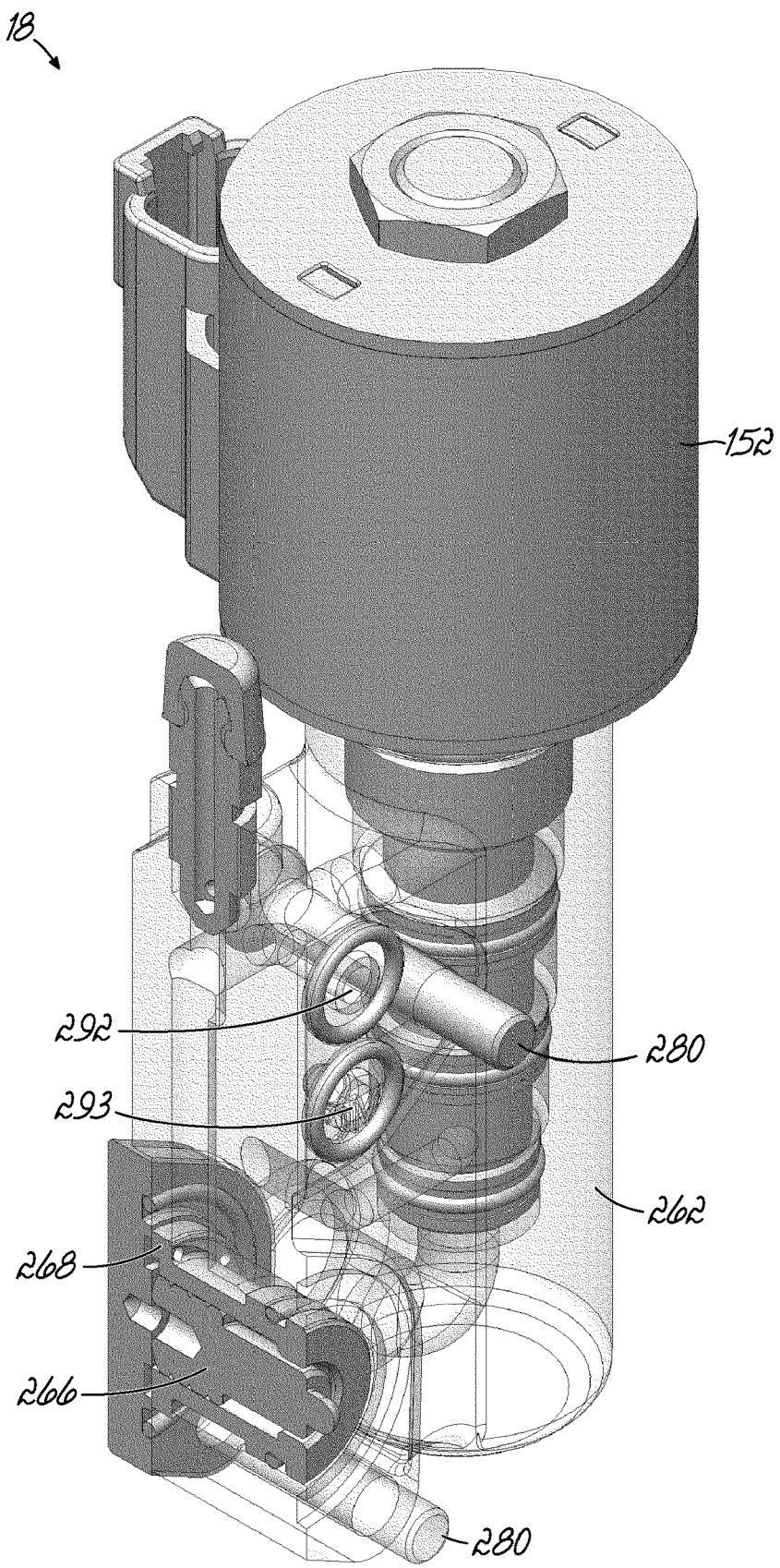
FIG. 4C is a cross-sectional view of another module of a modular electronic brake system in accordance with an embodiment of the invention.
Figure 4D:
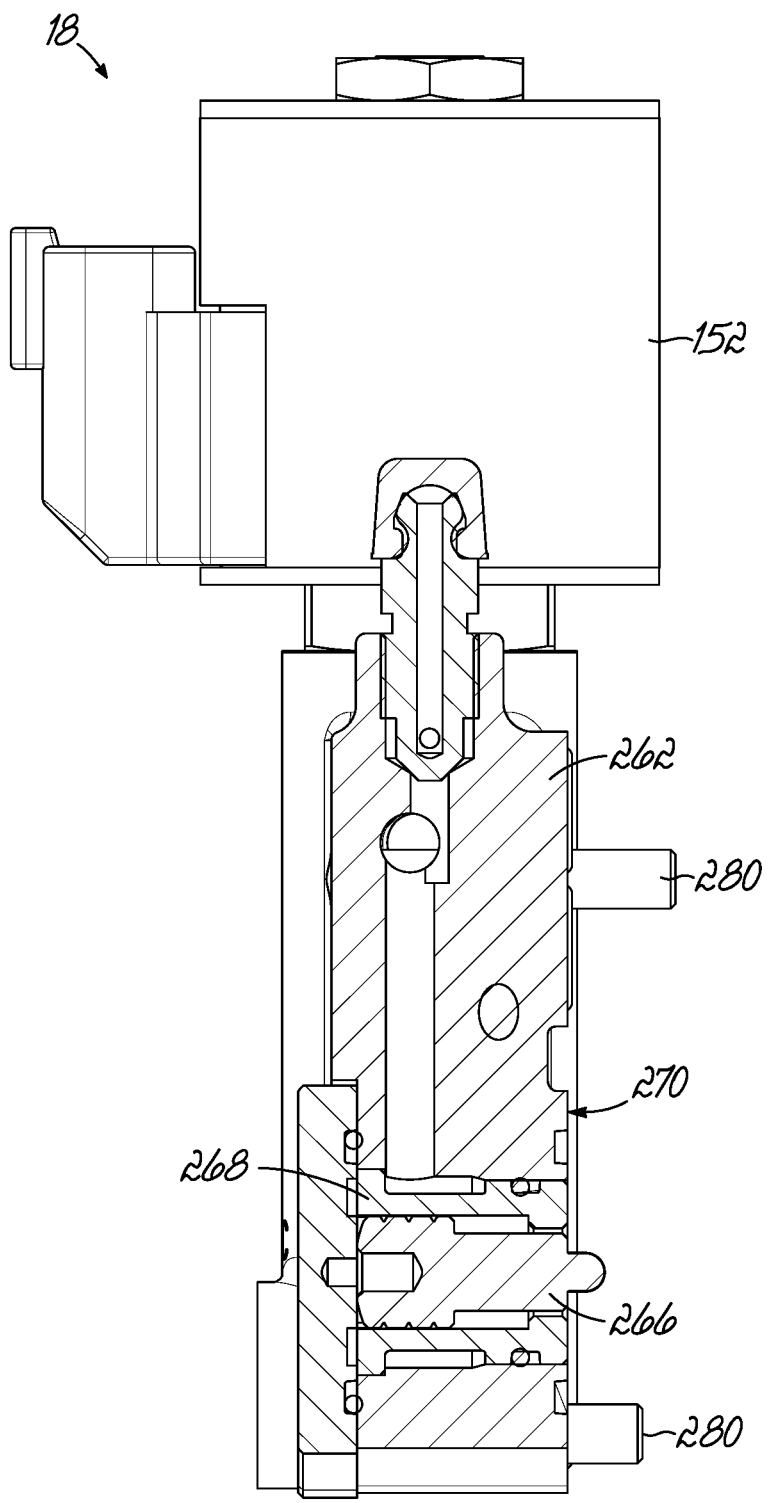
FIG. 4D is another a cross-sectional view of the module of FIG. 4C in accordance with an embodiment of the invention.
Figure 4E:
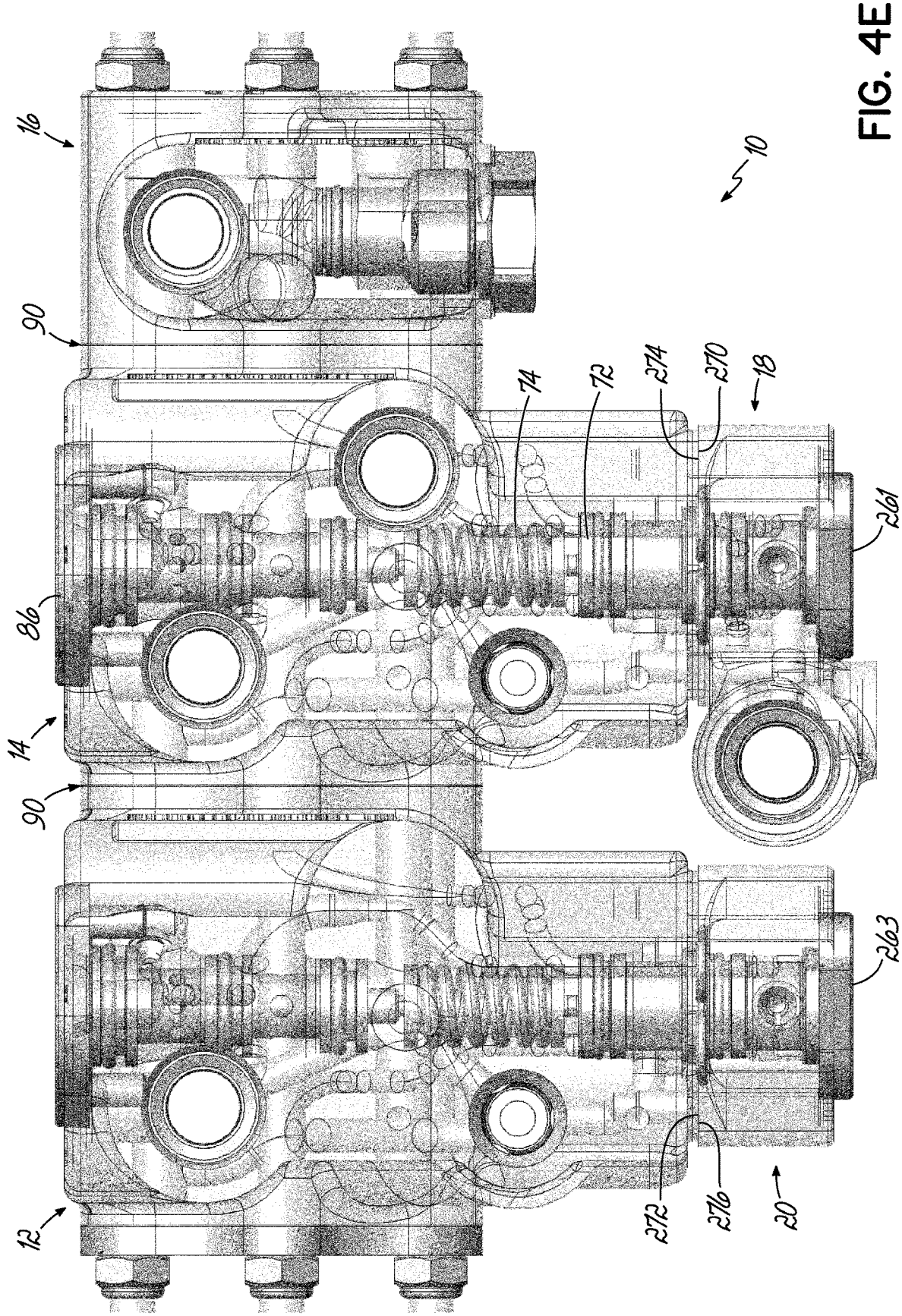
FIG. 4E is a cross-sectional view of several modules of a modular electronic brake system in accordance with an embodiment of the invention.

Referring to FIGS. 2 and 12A, and the cross-sections of FIGS. 4C, 4D, the master cylinders 142 are coupled to each of the main modules 12, 14 through port 260 of module 18 and mode selection valve 152 which switches between electronic and hydraulic modes for the system 10. In that way, the system can provide a hydraulic mode, as a possible backup mode, based upon an electronic failure, such as the failure of the ECU 150. Or a hydraulic mode might be provided as a feature of the system 10. Pressure is provided through master cylinder (MC) lines 252 to the mode selection valve 152. A valve 254 may be utilized to select the highest pressure provided by the master cylinders 142 through lines 252, such that the master cylinder input on line 256 is provided to valve 152 to be passed to the respected relay valves 68 of each of the modules 12, 14. While the hydraulic functionality is provided through the master cylinders 142 might be used as a backup system, if desired for a particular application, it can be the primary input source for pressure to the modules 12, 14. In both such cases, as illustrated in FIG. 12A, master cylinder connection module 250 feeds hydraulic pressure from master cylinders 142 which are coupled to actuators 140, such as brake pedals. As the master cylinder is displaced, hydraulic fluid is delivered to an input port of the master cylinder connection module 250 as illustrated at port 260 shown in FIG. 2.

The modules 18, 20 making up the master cylinder connection module 250, each include appropriate housings 262, 264 which form manifolds for the flow of hydraulic fluid as disclosed herein. The manifolds of the housings 262, 264 ensure the fluid paths as discussed with respect to FIGS. 12A-12E, for example, and so the exact arrangement inside the housing is not limiting as long as the fluid is directed and presented between the apertures 292, 293, 295 well as the coupling between the valve elements 266 and 72 as illustrated when the modules are coupled together at the interfaces.

As illustrated in cross-sections 4C, 4D, the modules 18, 20 include a plunger 266 that moves in a plunger sleeve 268 under the direction of hydraulic fluid. Referring to FIG. 4, each of the modules 18, 20, in accordance with aspects of the invention incorporates a mounting surface or interfaces 270, 272 in the housings 262, 264. The mounting surfaces match similar mounting surfaces or interfaces 274, 276 in the housings 54, 56 to provide fluid coupling between the modules 18, 20 and modules 14, 12 (FIG. 2). The valve elements 72, 266 are coupled together to operate as described herein. The mounting surfaces and modular interfaces ensure proper flow of hydraulic fluid between the individual modules 12, 14, 18 and 20 to incorporate a master cylinder connection module functionality, such as a backup or for a desired functionality for a particular braking application. To that end, as illustrated in FIG. 4, the interface surfaces might incorporate alignment structures 280 which interface with appropriate alignment openings 282 in the modules 12, 14. Alignment structures ensure the alignment of the apertures between the modules 18, 20 and modules 12, 14 and also the valve elements to ensure that the proper fluid flow passages of the manifolds of the modules are in alignment at the interfaces between the modules. If a master cylinder connection module 250 is not utilized, the mounting faces 274, 276 as shown in FIG. 2 might be sealed, such as with a plate similar to plates 261, 262 that are coupled with the modules 18, 20 to seal one side of the module opposite the modular system 10.

In operation, as the master cylinder is displaced, hydraulic fluid is delivered through the mode selection valve 152 to the input ports of the respective modules 18, 20. As the pressure in the fluid increases, it acts upon the respective plungers 266 and the plungers are displaced to act upon the respective plungers 72 in the adjacent main modules 12, 14. In that way, the master cylinder connection module 250, and the respective modular portions 18, 20 deliver hydraulic pressure to the brakes as described herein without the use of the valves 50, 52. If the master cylinder connection module 250 is employed as a backup system, the electro-hydraulic mode selection valve 152 is energized by the ECU upon vehicle/system startup when no electrical fault is present.

Figure 7A:
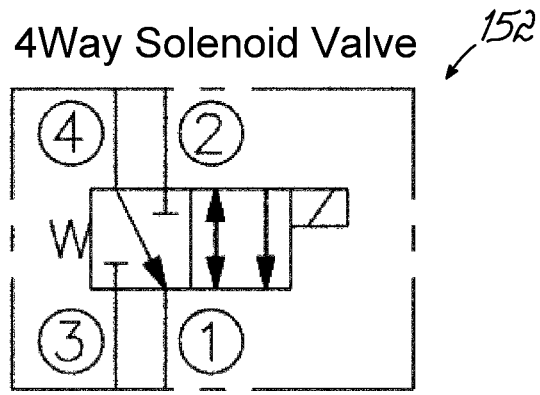
FIGS. 7A and 7B are schematic views of a valve and its pressure and flow characteristics in accordance with an embodiment of the invention.
Figure 7B:
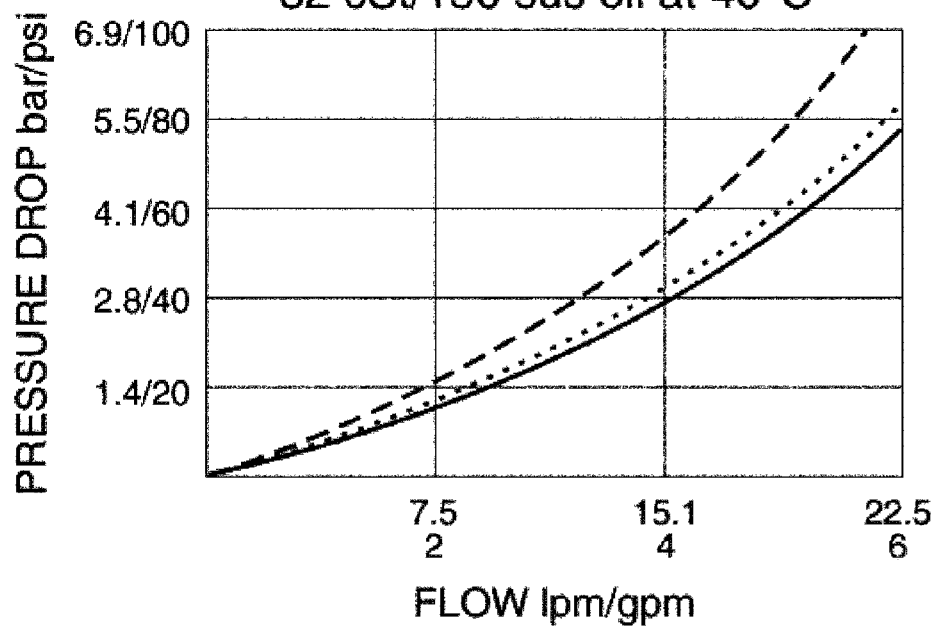

An appropriate valve for the mode selection valve 152 is illustrated in FIG. 7A with an appropriate pressure and flow diagram as shown in FIG. 7B. Particularly, valve 152 may utilize a solenoid-operated, 4-way, 2-position valve, which is a direct-acting, spool-type, screw-in hydraulic cartridge valve. Upon operation, when the valve is energized the spool shifts to provide flow from 3 to 4 and from 2 to 1 as illustrated thus isolating the master cylinders 142 from the main brake modules 12, 14. Furthermore, the connection from 2 to 1 provides hydraulic feedback from the brake channel to the master cylinders, 142 through line 290 as illustrated in order to provide an operator with the natural reaction force back through the actuators 140 or brake pedals. If electrical power in the system were to fail, or if the ECU otherwise operated valve 152 to deenergize the valve, the flow would be from 4 to 1 thereby connecting the master cylinder to the system through the master cylinder connection module 250 and allowing hydraulic activation of the brakes, through the modules 12, 14, the pilot valves 50, 52 and the relay valves 68 as described herein.

The master cylinder relay module 18 feeds hydraulic pressure from the master cylinder relay module 18 via passages through the modules 12, 14 provided at the mounting face surfaces or interfaces 270, 272, 274, 276 (FIGS. 2, 4). The interfaces of the modules provide the proper alignment of fluid ports for flow of fluid in the modules. For example, apertures 292 in each module provides a coupling of the master cylinder fluid flow in the interface surfaces 270, 272 of the modular sections 18, 20 of the master cylinder connection module 250 with interface with apertures 294 in the interface surfaces 274, 276 in the main brake modules 12, 14 to provide the necessary fluid flow between the portions of the master cylinder connection module 250. In that way fluid through module 18 and valve 152 is provided to the core brake modules and also the module 20. The manifold and various passages of the brake modules ensure the flow of the master cylinder fluid through the modules. Similar to the action, as described with respect to the pilot section or module 18 of the master cylinder connection module, pressure in the relay section or module 20 acts on an appropriate plunger 266 therein, as shown in FIGS. 4C, 4D and imparts a force on a corresponding plunger 72 in the module 12 to displace a spool and provide braking pressure. The modules 14, 18 also include ports 293 to provide tank T connection to the module 18 through module 14 and also ports 295 to provide a braking pressure feedback to a sensor for the ECU.

As noted, the ECU provides the signal input and output, processing, memory, diagnostics, and vehicle communication interface utilized for operating the modular brake system 10 as described herein. The ECU runs software to provide the industry-standard processes for power management, self-testing, diagnostics, fault detection, memory, and communications. It also contains all the performance functions to be realized through integration with the various valve arrangements provided in the modular system as described herein. The brake system 10 of the invention and the ECU are configured for accepting braking commands from a vehicle autonomy system. Typically, the present invention may be used to provide autonomous braking wherein the brakes are controlled by a vehicle autonomy system through a communication network in the vehicle. In accordance with another feature of the invention, the brake output is controlled by electronic signals to one or more of the various valves as discussed herein in response to actuator or brake pedal movement. For example, the angle of the brake pedal can be detected for providing certain braking commands. Furthermore, through the modules 12, 14 and appropriate anti-lock brake valves 60, anti-lock braking functionality is provided wherein individual brake pressure is reduced by electronic control in response to impending wheel lockup.

Figure 13:
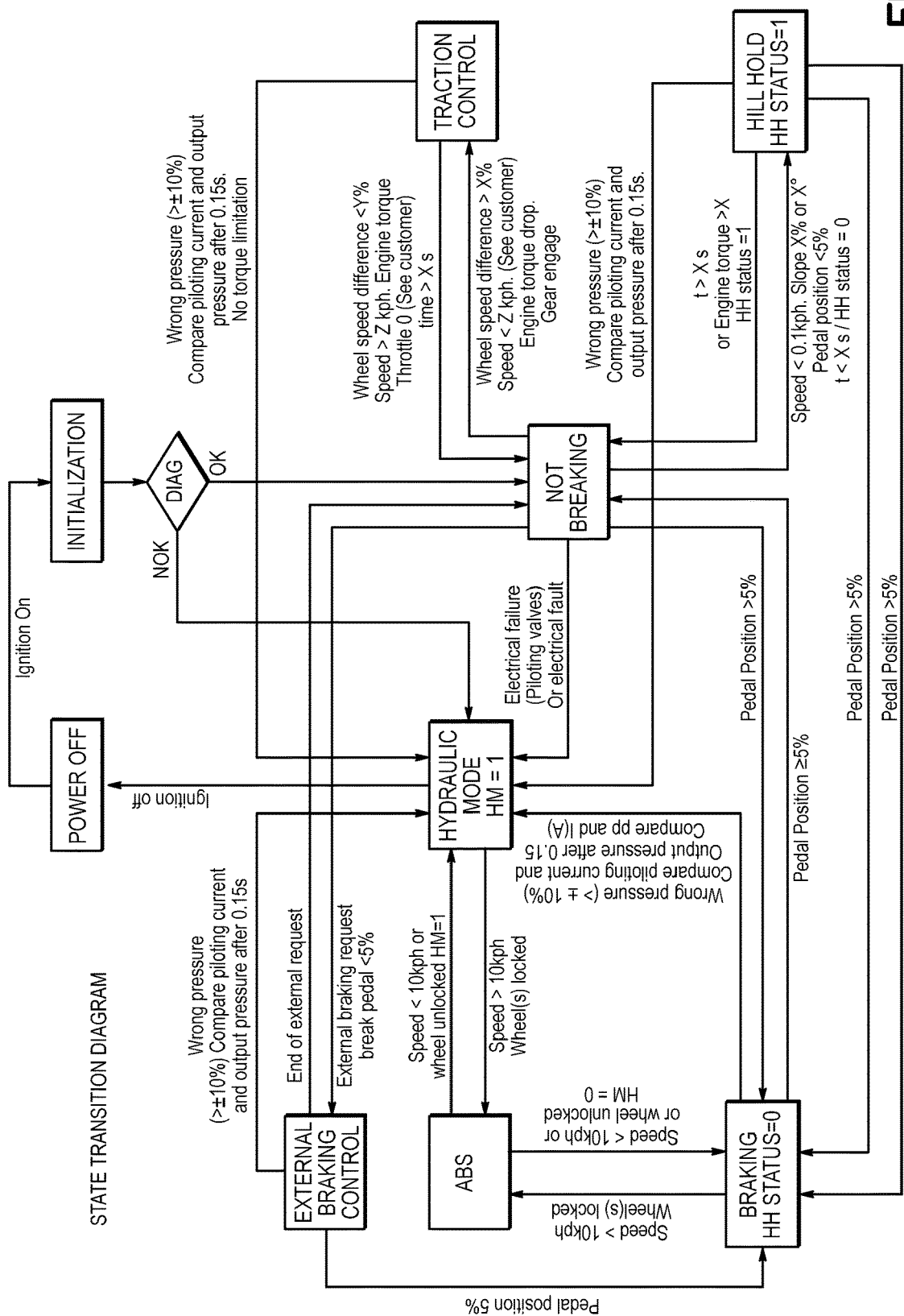
FIG. 13 is a state diagram for illustration of the operational states of the brake system configurations in accordance with various embodiments of the invention.

The present invention also provides hill hold electronically wherein when the brakes are applied and the vehicle is stationary, the brakes remain engaged for a short duration after the brake pedal is released. This prevents the vehicle from rolling backward down a slope when the driver removes their foot from the brake pedal, in order to apply the accelerator pedal. The brakes may release based upon an elapsed time as controlled through the ECU or by an increase in requested torque provided (FIG. 13). The invention also provides brake assisted steering wherein a single brake may be applied according to driver request via the brake pedal and the ECU in order to assist the vehicle making a very tight turn. Automatic brake assisted steering is also provided wherein a single brake is applied according to the ECU based on vehicle speed and the steering angle to assist the vehicle making a very tight turn. In accordance with another feature of the invention, hill descent control is provided through the modular system and ECU wherein the brakes are commanded by an electronic control signal to maintain a preselected vehicle speed when the requested braking torque is near zero while the vehicle speed is increasing, and the vehicle speed control is active. The present invention also provides adaptive cruise control wherein brakes are applied under the command of an electronic vehicle speed management system in order to maintain a safe distance from other vehicles or fixed objects (FIG. 13). Accordingly, the modular elements of the invention may be arranged in a plurality of configurations in order to provide various different braking features.

Figure 12B:
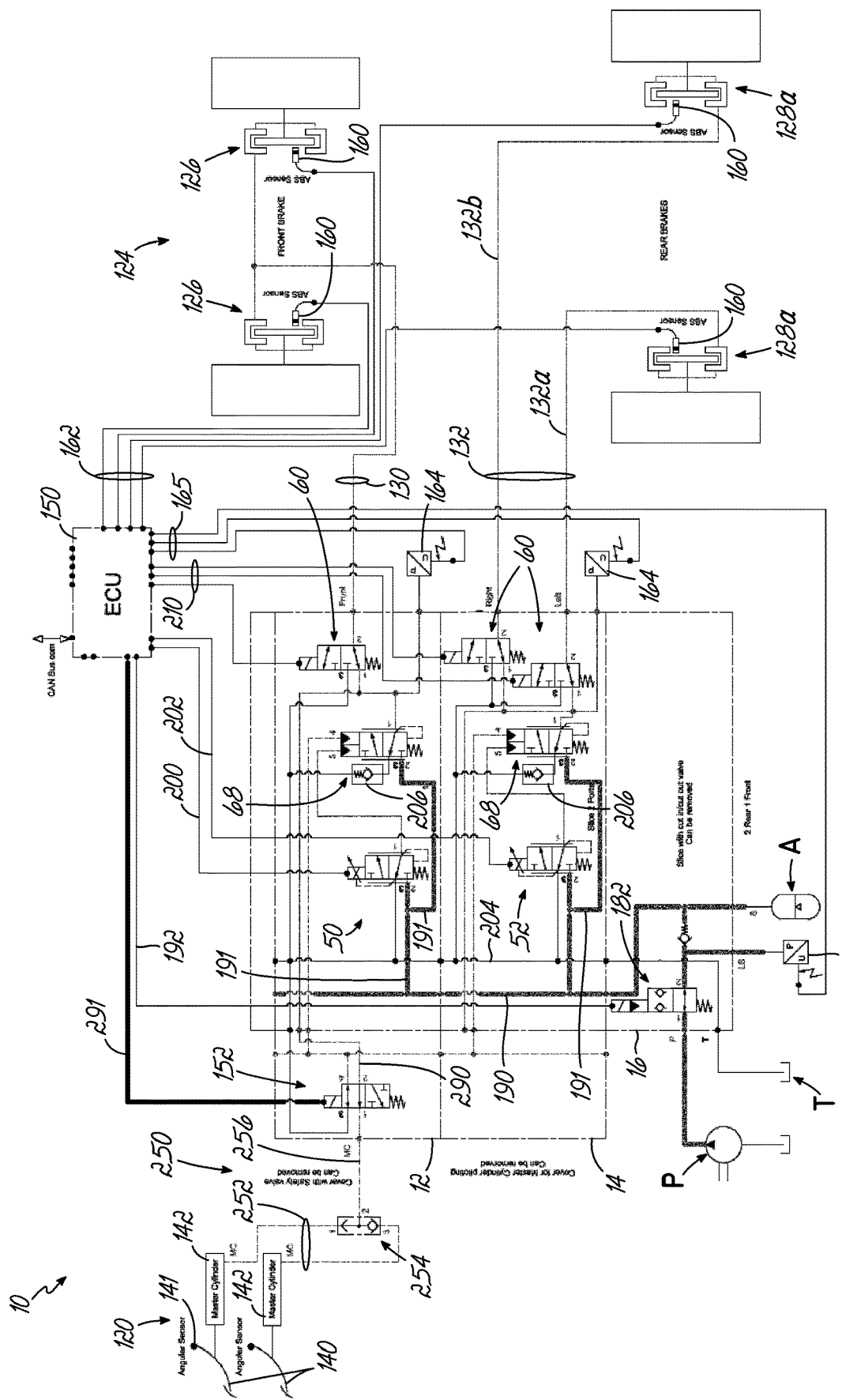
FIG. 12B is another schematic circuit view of the hydraulic circuit of the brake system in an operational mode in accordance with an embodiment of the invention.

Referring to FIGS. 12A-12E, the operation of one exemplary embodiment of the system is described herein. Specifically, as described, FIG. 12A shows the various fluid interconnections between the modules and valve components of the invention with respect to the actuator and master cylinder assemblies as well as the vehicle brakes. It also shows the electrical control connections between the electronically controlled valves and sensors and the ECU. Referring to FIG. 12B, while the engine is being started, a signal might be sent from the ECU on line 291 to the mode selection valve 152 indicating that there has not been an electronic failure, and thus the electronic braking control features may be applied. The master cylinder pressure is removed from the operation. Pressure may be applied on line 190 from the pressure supply and/or accumulator to the main brake modules 12, 14 and the respective valves 50, 52 and 68 in each of those modules as shown by the thicker lines in FIG. 12B.

Figure 12C:
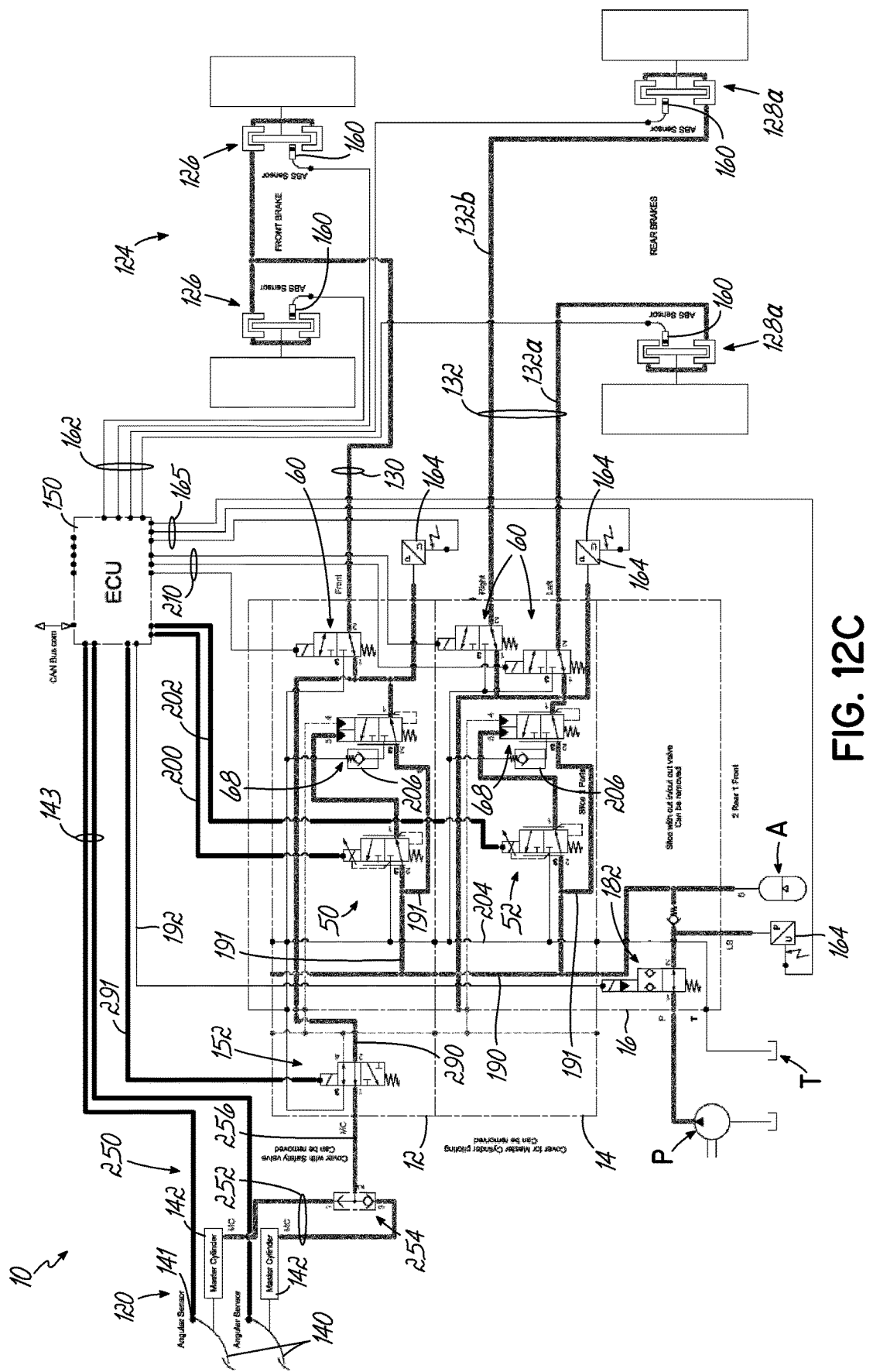
FIG. 12C is another schematic circuit view of the hydraulic circuit of the brake system in an operational mode in accordance with an embodiment of the invention.

FIG. 12C illustrates electronic brake actuation in accordance with the invention wherein the thickened lines illustrate either control signals to or from the ECU and the delivery of system pressure brake fluid to various of the valves and components as illustrated. For example, during normal braking, a signal from the pedal angular sensors 141 or other appropriate sensors for detecting movement of an actuator or pedal 140, is sent to the ECU, such as on lines 143. The ECU then energizes the pilot valves 50, 52 of the main brake modules 12 and 14 through control lines 200, 202. Such actuation of those pilot valves will pilot the hydraulic relay valves 68 in the modules 12, 14 by delivering fluid proportionally to the valves 68 and proportionally increasing pressure through the valves to the various brake channels 130, 132. During braking, all of the input lines or sensor lines to the ECU might also be read for the necessary control. In brake actuation, the mode selection valve 152 is activated through line 291 so that electronic control of the braking system is provided rather than hydraulic control. The various pressure sensors 164 on the brake channel lines verify that the pressure in the braking system corresponds to that braking pressure which is commanded by the angular position of the brake pedal or other actuator.

In accordance with another feature of the invention, the pressure sensors are also used in a closed loop to regulate the braking pressure of the system. The ECU runs a diagnostic function to monitor the brake system condition and performance and the ECU may provide a signal to the driver of the vehicle in the event of potential failure, as sensed by sensors 164.

Figure 12D:
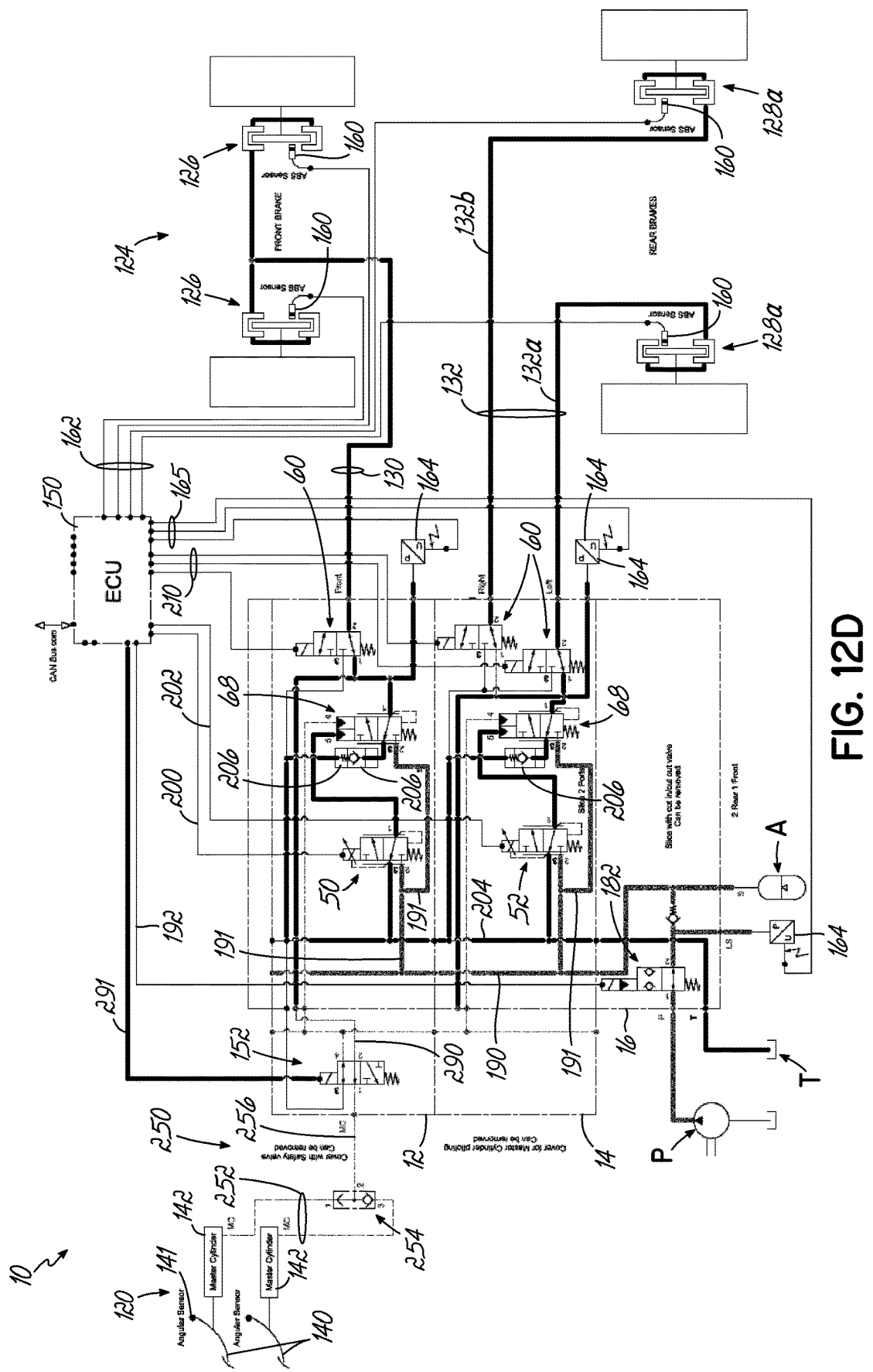
FIG. 12D is another schematic circuit view of the hydraulic circuit of the brake system in an operational mode in accordance with an embodiment of the invention.

Referring to FIG. 12D, when the pedals are released, the ECU stops activating the valves 50, 52 through lines 200, 202. As such, the valves 68 are released of the supply pressure P and the braking lines are connected to tank T pressure through line 204 and check valves 206. This is handled according to an established proportional relationship between the angular displacement of the brake pedals provided by the sensors 164 and the current provided by the ECU to the respective valves 50, 52.

In accordance with one aspect the invention, as described herein, the check valves 206 in connection with the relay valve 68 of the main brake modules 12, 14 can be coupled to the tank line 204 as shown to create and maintain a residual standby pressure, such as a pressure of 1-2 bar. Such a pressure is monitored by the pressure sensors 164. When braking is not occurring, the system will see the tank T pressure. In the case of failure on the brake lines, the residual pressure will drop down to below 1 bar and the ECU can sense that and signal to the driver of the vehicle through the ECU that there is a problem with the brake system. As such, in accordance with the electronic braking features of the invention, the driver can have an indication of the brake failure before they even need to use the brakes.

For brake steering, such as with equipment including agricultural tractors and harvesters as well as backfill loaders used in construction, modular brake system 10 of the invention can employ individual brake pedals to separately control the brakes on each side of the vehicle. In that way a brake force is combined with the steering input to enable tight turning. The electronic braking features of the modular brake system 10 of the invention provide that same functionality. In such an arrangement, the individual brake pedals utilize the sensors 141 to detect pedal motion and position. The sensors send appropriate signals to the ECU (FIG. 12C) and the ECU functions to translate the data into appropriate commands to the brake modules 12, 14 as disclosed herein. To execute a brake steer maneuver, the ECU energizes the brakes, such as through one of the valves 50, 52 while simultaneously activating one or more of the ABS valves 60 in opposition to the driver's intention. In that way hydraulic pressure is delivered only to the brake requested by the driver and removed from other of the brakes to effect the brake steering. If a vehicle has front brakes, they generally will not be activated during a brake steering scenario.

Other features can be implemented, such as the hill holding feature and the traction control feature utilizing a combination of the electronic control of the braking modules as well as selective implementation of ABS valves 60. Accordingly, the electronic braking features of the invention may be implemented through various functions utilizing electronically controlled pilot valves 50, 52 with proportional relay valve 68 and on/off pressure reduction valves, such as the ABS valves 60. The system 10 can electrically modulate the brakes on and off, can electrically divert brake pressure to tank T and may optionally hydraulically modulate the brakes on and off according to a hydraulic backup feature. The various valve assemblies can be joined together to create larger more complex valve assemblies to suit vehicles with different brake application and different numbers of wheels and brakes. The various components of the individual valve assemblies can be arranged to meet specific vehicle brake system configurations and implement interface surfaces along with the internal manifolds of the housings to deliver system pressure, tank pressure, and proportionally controlled valve pressure through the modules as illustrated in FIGS. 1-4. The modules couple together easily with the repetitive interfaces 90 providing the desired flow through the multiple modules.

The unique modular mating provided by the mounting interfaces and surfaces and the functional modules ensures that pressurized fluid is controlled and delivered through the modules with selective control of the electronic valves to implement the various braking functions. As such, the system can be arranged in a distributed fashion based upon customer needs or preferences. The valves can be placed close to their respective brake actuators or otherwise arranged in such a way as most advantageous to a vehicle integrator. The operator input originates with the vehicle brake pedal or other actuator. Position sensors relay the brake pedal position and the driver's intentions to the ECU. The ECU translates the driver's attention into control signals which cause the electro-hydraulic valves 50, 52 to open proportionally to that command. This in turn allows hydraulic pressure (pilot pressure), to act on a piston, which, through a spring, moves a spool in a bore in the various relay valve 68. As the spool moves and the bore hydraulic pressure is allowed to pass through the housing of the modules 12, 14 and onto vehicle brakes to provide brake pressure as described. The relationship of the valve components and the control is provided through the ECU and provides an output pressure that is proportional to the pedal position and is appropriate to the vehicle. The ECU also provides an interface with other control systems of the vehicle for various braking scenarios as discussed herein.

For ABS operation as noted, the ECU software can determine the vehicle speed by measuring the wheel rotation through the various ABS sensors 160 installed near each wheel. In the case of impending wheel slip during a braking event, the ECU commands the various ABS valves 60 to temporarily decrease brake pressure to prevent a wheel from stopping. This is commonly referred to as anti-lock braking. In the modular system, such anti-lock braking is achieved by adding the electro-hydraulic valves 60 to the output of the various main brake modules 12, 14.

In accordance with another feature of the invention, modular brake systems may incorporate a hydraulic feature in combination with the electronic control. In one embodiment, the hydraulic feature may be utilized as a backup system that might be utilized based upon electronic failure of the ECU to provide proper braking. Alternatively, the hydraulic feature may be an additional feature provided in the modular brake system as desired by a customer.

Figure 12E:
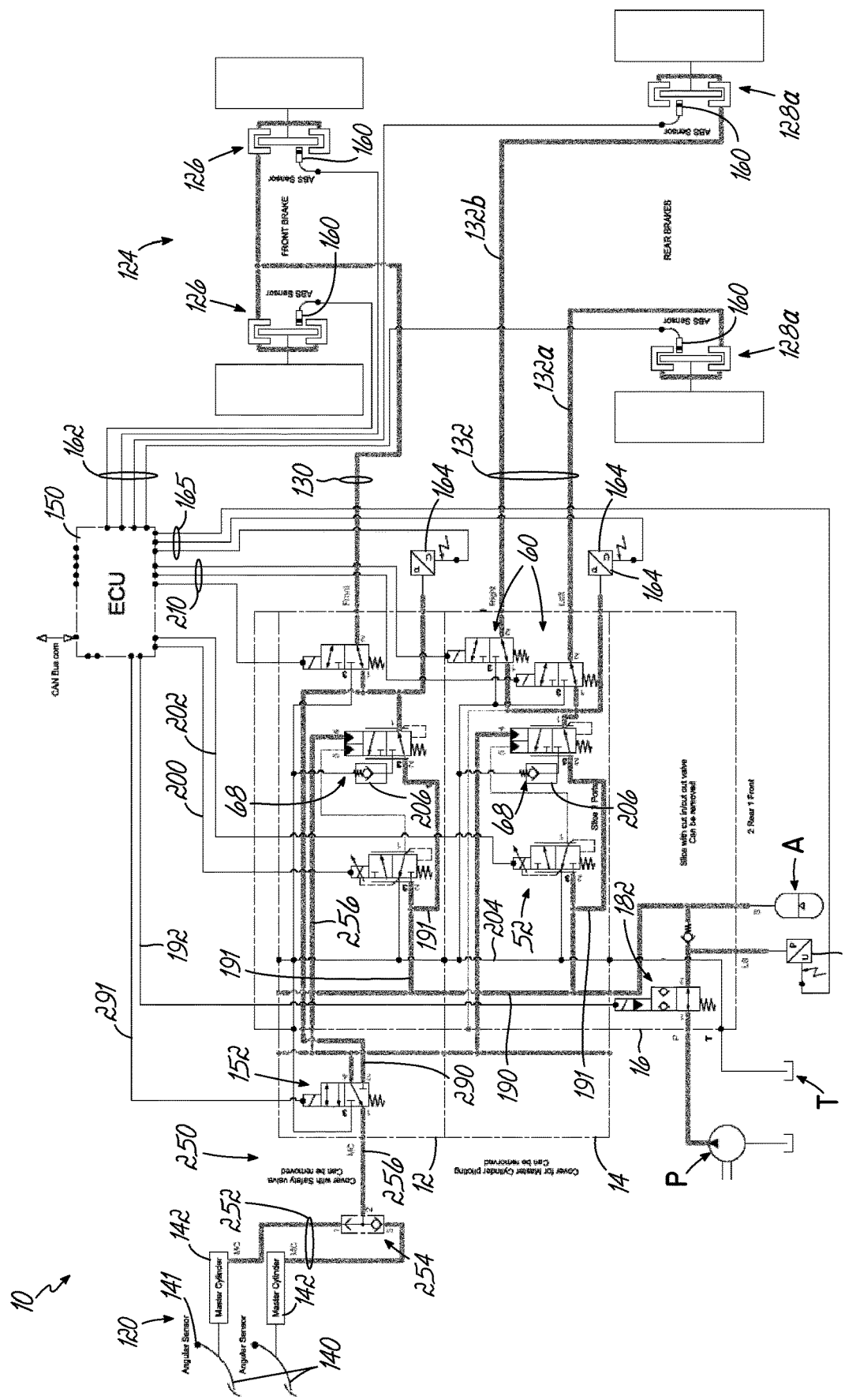
FIG. 12E is another schematic circuit view of the hydraulic circuit of the brake system in an operational mode in accordance with an embodiment of the invention.

Turning to FIG. 12E, for such a feature the mode selection valve 152 is deenergized by the ECU, which puts the pressure provided by the master cylinder on line 256 to each of the relay valves 68 of the modules 12, 14 in connection with the master cylinder pressure. That pressure then pilots the relay valve 68 in a proportional sense without the electronic control provided by electro-hydraulic valves 50, 52. In that way, braking can be applied on channel lines 130, 132 as shown. Control of valve 152 is provided through the ECU on line 291 (FIG. 12B).

Figure 14:
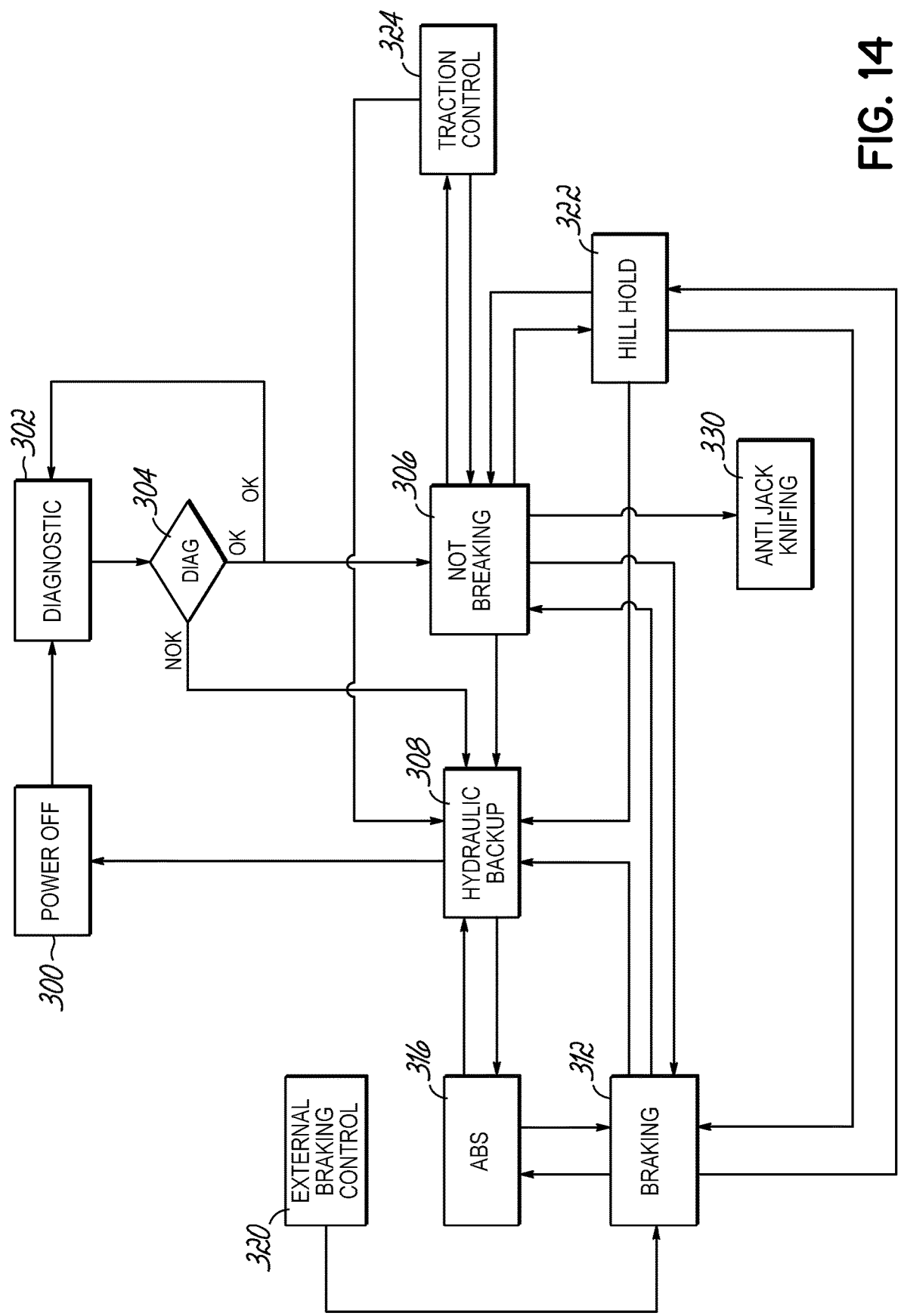
FIG. 14 is a state diagram for illustration of the operational states of the brake system configurations in accordance with various embodiments of the invention.

In accordance with one aspect of the invention, various braking features might be provided as set forth in FIGS. 13 and 14, which are top-level state diagrams for the braking system 10 of the invention. As is illustrated, the sensors may track the brake pedal angular engagement and may go from a non-breaking state to one or more braking states based upon exceeding a certain braking threshold. As noted, based upon an electrical failure, the system might be placed in hydraulic mode or braking might be provided through the master cylinders as described. As noted, the hydraulic mode may be reached through various different paths associated with various other braking functions, such as the ABS function or a hill hold function or traction control function based upon wheel speed differences, the speed of the vehicle, the position of the pedal, and/or engine torque as disclosed.

With reference to FIG. 14, various states for the system 10 are set forth in accordance with the invention. Once power is ON, leaving the power Off state 300, flow progresses to the Diagnostic state 302. In the Diagnostic state, the system continually checks the condition of all connected sensors and valve actuators to ensure they are in a proper state for operation. When faults are detected, a Diagnostic system running on the ECU initiates the appropriate action to notify the machine operator and place the system in the safest operating mode. For example, the system may initiate a hydraulic backup as discussed herein. Based on an evaluation an OK condition or not OK condition per block 304, the system might progress to a Not Braking state 306 or Hydraulic Backup state 308.

In the Not Braking state 304, the system takes no action with respect to the braking pressures. It is in a mode of readiness wherein numerous calculations are taking place. All sensor values are being monitored and recorded in preparation for future actions. Concurrently diagnostic checks are carried out for all connected electrical components. In use of the system 10, the signal measurements of the Not Braking state and diagnostics of the continue to operate in all other functional states, as reflected by Diagnostic block 302.

If the pedal or actuator position signal exceeds a predetermined threshold the system transitions from the Not Braking state 306 to the Braking state 312. In the Braking state 312 the system 10 translates the driver's intention from the brake pedal angle sensor into an electrical signal to the ECU that actuates one or more of the electro-hydraulic valves, such as in modules 12, 14. The electro-hydraulic valves deliver a hydraulic pressure to shift one or more relay valve(s) of a module. This thereby delivers pressurized oil to the brake actuator, as discussed herein. The pressure in this oil is measured by a pressure sensor whose signal is returned to the ECU controller. This signal is monitored continually and compared to the driver's intent from the actuators to ensure the correct pressure is delivered to the brakes.

In a Braking state 312, the Anti-lock Braking (ABS) mode might be activated, thus putting the system into an Anti-lock Braking (ABS) state 316. The system 10 activates the ABS mode/state when certain criteria related to wheel slip are satisfied, as noted for example with respect to FIG. 13. Within this mode ABS, algorithms run by the ECU command the ABS valves 60 to cycle and reduce the hydraulic pressure in certain brake lines as discussed herein in order to reduce the braking torque and prevent individual wheels from skidding. During this mode of control, a slipping wheel changes from decelerating to accelerating thereby recovering its traction. When said wheel slip falls below a predetermined slip threshold the ABS control over that wheel ceases and normal braking control is restored with a return to the Braking state 312. The ABS operating mode is active whenever any wheel on the vehicle exceeds a slip threshold while normal braking is active.

The Hydraulic Backup state or Mode 308 becomes active when certain electrical or hydraulic pressure faults occur that prevent electronic control of the brake pressures. As shown in FIG. 14, the Hydraulic Backup state may be reached from various states of the system. The diagnostic function triggers this state 308 when faults are detected and simultaneously triggers a warning indicator in the instrument panel to alert the vehicle operator to the change. When this happens, the hydraulic valve 152 is switched to connect a hydraulic master cylinder to one or more of the brake relay valve(s), 68 thereby enabling manual mechanical control of the brake pressure. From that point forward when the operator depresses the brake pedal they are connected hydraulically to the brake control system, bypassing the ECU control of the brake pressure.

The system 10 also provides for external control of the braking system, such as to send signals to the ECU in the Braking state 312. In the External Braking Control state 320, the system 10 enables external devices attached to the vehicle or machine to control the braking system. In fact, this state is a point of integration for such devices to send signals into the Braking state 312 as shown in FIG. 14.

The Hill Hold state 322 may be reached from the Braking state 312 and in that state or mode, the system will hold the brakes in an On condition after the vehicle has come to a halt. As noted in FIG. 13, the Hill Hold state may evaluate a sensor the indicates the slope of the road or slope of the vehicle.

For traction control, a Traction Control state 324 may be used. The Traction Control state 324 is activated outside of the braking modes or Braking state 312 but applies hydraulic pressure to selected brakes when individual wheels are slipping while the vehicle is in a driving mode. This mode considers additional vehicle parameters available over a vehicle data network to determine the correct brake system action.

An Anti-Jack Knifing state or mode 330 may be reached as a function of speed, angle between a tractor trailer and/or the force between the tractor and trailer based on the feedback of other systems to the ECU. The ECU will control system 10 to actuate a trailer brake and a tractor brake using Braking state and the actuation of valves 50, 52 to realign the vehicles.

In accordance with another aspect of the invention, the various modules of the system may be coupled together into a number of different configurations, based upon the number of wheels in a vehicle, the number of braking channels desired, the ABS function provided and the desire for a hydraulic mode, such as for backup purposes or as a selected function. FIG. 11 provides a disclosure of various different configurations based upon using a number of different brake channels, such as channels 130, 132 as described as well as a number of brake pressure sensors 164 along with hydraulic mode and master cylinder control and/or an ABS function as shown on the left side of FIG. 11. The right side of FIG. 11 indicates the number of different modules, master cylinders, sensors, and various module valves that may be implemented for the noted configuration. As may be seen, the various modules of the invention may be mixed and matched as desired to address a large number of different configurations and different features as desired by a customer.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A brake system comprising:
   a plurality of braking modules, each braking module including a housing forming at least one manifold for the delivery of fluid through the module to at least one brake;
   at least one of the braking modules configured for coupling to a pressurized fluid source to provide fluid at a system pressure and coupling to a tank fluid source to provide fluid at a tank pressure;
   each braking module including:
   a hydraulic valve positioned in the housing and coupled with the pressurized fluid source for delivering fluid through the module to the at least one brake to implement a braking function;
   an electro-hydraulic valve positioned in the housing and coupled with the pressurized fluid source, the electro-hydraulic valve configured for receiving electrical input signals and, in response to the input signals, configured for delivering fluid from the pressurized fluid source at an actuation pressure to the hydraulic valve, the actuation pressure being proportional to the system pressure based on the levels of the received electrical input signals;
   a plurality of module interfaces positioned on respective sides of the housings for coupling the braking modules together, the module interfaces including a repeated pattern of apertures in the housing for aligning between coupled braking modules, the aligned apertures configured for passing fluid at the system pressure and fluid at the tank pressure between the plurality of braking modules.

2. The brake system of claim 1 wherein the interfaces are positioned on opposing sides of the modules, the repeated pattern of apertures further including a plurality of alignment through holes configured for aligning between coupled brake modules, the brake system further including at least one alignment structure to extend between coupled braking modules for alignment of the repeated patterns of apertures.

3. The brake system of claim 1 further comprising a control unit coupled with the electro-hydraulic valves of the plurality of modules, the control unit receiving at least one signal from a brake actuator and using the brake actuator signal to generate the input signals to the electro-hydraulic valves.

4. The brake system of claim 1 wherein the hydraulic valve is configured to deliver fluid through the module to module to the at least one brake from a pressurized fluid source based on the at the actuation pressure.

5. The brake system of claim 1 further comprising a master cylinder module configured for coupling with a master cylinder for delivery of fluid at a master cylinder pressure to the master cylinder module, the master cylinder module configured for coupling with at least one of the braking modules for interfacing with the hydraulic valve of the at least one braking module, the master cylinder module including a mode selection valve for selectively providing fluid at a master cylinder pressure to actuate the hydraulic valve of the braking module for braking.

6. The brake system of claim 5 wherein the housing manifold of the at least one braking module coupled to master cylinder module is configured for delivering fluid at a master cylinder pressure to an interface of the at least one braking module, the repeated pattern of apertures at the interface including an aperture for passing fluid at a master cylinder pressure between the plurality of braking modules.

7. The brake system of claim 6 further comprising a relay master cylinder module configured for coupling with another of the plurality of the braking modules for interfacing with the hydraulic valve of the another braking module, the relay master cylinder module receiving fluid from the master cylinder module through the coupling with the at least one braking module interface and repeated pattern of apertures.

8. The brake system of claim 1 wherein each braking module further includes at least one anti-lock brake valve coupled with the housing manifold, the anti-locking brake valve selectively coupling to a tank fluid source for selective delivery of fluid at the tank pressure to the at least one brake.

9. The brake system of claim 8 wherein each braking module further includes a plurality of anti-lock brake valves coupled with the housing manifold, the anti-locking brake valves selectively coupling to the tank fluid source for selective delivery of fluid at the tank pressure to a plurality of brakes.

10. The brake system of claim 1 further comprising:
    a pressurized fluid source for coupling with at least one of the modules to provide fluid at the system pressure; and
    a tank fluid source for coupling with at least one of the modules to provide fluid at a tank pressure.

11. A brake system for controlling the operation of a vehicle, the brake system comprising:
    at least one brake;
    at least on actuator;

a control unit configured for receiving at least one signal from the at least one brake actuator and using the brake actuator signal to generate input signals;

a pressurized fluid source to provide fluid at the system pressure;

a tank fluid source to provide fluid at a tank pressure;

a modular system for coupling between the at least one brake and at least one actuator;

the modular system including a plurality of braking modules, each braking module including a housing forming at least one manifold for the delivery of fluid through the braking module;

at least one of the braking modules configured for coupling to the pressurized fluid source to provide fluid at a system pressure and coupling to a tank fluid source to provide fluid at a tank pressure;

each braking module including:

a hydraulic valve positioned in the housing and coupled with the pressurized fluid source for delivering fluid through the module to the at least one brake to implement a braking function;

an electro-hydraulic valve positioned in the housing and coupled with the pressurized fluid source, the electro-hydraulic valve configured for receiving electrical input signals from the control unit and, in response to the input signals, configured for delivering fluid from the pressurized fluid source at an actuation pressure to the hydraulic valve, the actuation pressure being proportional to the system pressure based on the levels of the received electrical input signals;

a plurality of module interfaces positioned on respective sides of the housings for coupling the braking modules together, the module interfaces including a repeated pattern of apertures in the housing for aligning between coupled braking modules, the aligned apertures configured for passing fluid at the system pressure and fluid at the tank pressure between the plurality of braking modules.

12. The brake system of claim 11 wherein the interfaces are positioned on opposing sides of the modules, the repeated pattern of apertures further including a plurality of alignment through holes configured for aligning between coupled brake modules, the modular system further including at least one alignment structure to extend between coupled braking modules for alignment of the repeated patterns of apertures.

13. The brake system of claim 11 further comprising at least one sensor coupled with the control unit for sensing a condition in the brake system.

14. The brake system of claim 11 wherein the hydraulic valve is configured to deliver fluid through the module to the at least one brake from the pressurized fluid source based on the actuation pressure.

15. The brake system of claim 11 further comprising a master cylinder module configured for coupling with a master cylinder for delivery of fluid at a master cylinder pressure to the master cylinder module, the master cylinder module configured for coupling with at least one of the braking modules for interfacing with the hydraulic valve of the at least one braking module, the master cylinder module including a mode selection valve for selectively providing fluid at a master cylinder pressure to actuate the hydraulic valve of the braking module for braking.

16. The brake system of claim 15 wherein the housing manifold of the at least one braking module coupled to master cylinder module is configured for delivering fluid at a master cylinder pressure to an interface of the at least one braking module, the repeated pattern of apertures at the interface including an aperture for passing fluid at a master cylinder pressure between the plurality of braking modules.

17. The brake system of claim 16 further comprising a relay master cylinder module configured for coupling with another of the plurality of the braking modules for interfacing with the hydraulic valve of the another braking module, the relay master cylinder module receiving fluid from the master cylinder module through the coupling with the at least one braking module interface and repeated pattern of apertures.

18. The brake system of claim 11 wherein each braking module further includes at least one anti-lock brake valve coupled with the housing manifold, the anti-locking brake valve selectively coupling to the tank fluid source for selective delivery of fluid at the tank pressure to the at least one brake.

19. The brake system of claim 18 wherein each braking module further includes a plurality of anti-lock brake valves coupled with the housing manifold, the anti-locking brake valves selectively coupling to the tank fluid source for selective delivery of fluid at the tank pressure to a plurality of brakes.

* * * * *